United States Patent
Wang et al.

(10) Patent No.: US 7,606,138 B2
(45) Date of Patent: Oct. 20, 2009

(54) MULTI-SYMBOL ENCAPSULATED OFDM SYSTEM

(75) Inventors: Xianbin Wang, Kanata (CA); Yiyan Wu, Kanata (CA)

(73) Assignee: Her Majesty the Queen in right of Canada, as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 937 days.

(21) Appl. No.: 10/951,761

(22) Filed: Sep. 29, 2004

(65) Prior Publication Data

US 2005/0068886 A1 Mar. 31, 2005

Related U.S. Application Data

(60) Provisional application No. 60/506,174, filed on Sep. 29, 2003.

(51) Int. Cl.
*H04J 11/00* (2006.01)
(52) U.S. Cl. .................. 370/210; 370/208; 370/211
(58) Field of Classification Search ............ 370/210, 370/208, 211
See application file for complete search history.

(56) References Cited

U.S. PATENT DOCUMENTS

| | | | |
|---|---|---|---|
| 5,285,474 A | 2/1994 | Chow | |
| 5,371,548 A | 12/1994 | Williams | |
| 5,732,113 A | 3/1998 | Schmidl | |
| 6,137,848 A | 10/2000 | Ho et al. | |
| 6,535,550 B1 | 3/2003 | Cole | |
| 6,952,394 B1 * | 10/2005 | Kim et al. | 370/208 |
| 6,965,637 B2 * | 11/2005 | Davis et al. | 375/222 |
| 7,324,437 B1 * | 1/2008 | Czylwik et al. | 370/210 |
| 7,352,730 B2 * | 4/2008 | Ghosh et al. | 370/338 |
| 2004/0076239 A1 * | 4/2004 | Yu et al. | 375/260 |

OTHER PUBLICATIONS

David Falconer, Frequency Domain Equalization for Single-Carrier Broadband Wireless Systems, Feb. 15, 2002.*
David Falconer (Frequency Domain Equalization for Single-Carrier Broadband Wireless Systems, Feb. 15, 2002).*
H. Sari, "Transmission Techniques for Digital Terrestrial TV Broadcasting", IEEE Commun. Mag. vol. 33, No. 2, Feb. 1995, pp. 100-109.
D. Falconer et al, "Frequency Domain Equalization for Single-Carrier Broadband Wireless Systems", IEEE Commun. Mag, vol. 40, Issue 4, Apr. 2002, pp. 58-66.
H.-K. Song et al, "Frequency-Offset Synchronization and Channel Estimation for OFDM-Based Transmission", IEEE Commun. Ltrs, vol. 4, No. 3, pp. 95-97, Mar. 2000.

* cited by examiner

*Primary Examiner*—Huy D. Vu
*Assistant Examiner*—Kibrom T Hailu
(74) *Attorney, Agent, or Firm*—Teitelbaum & MacLean; Neil Teitelbaum; Doug MacLean

(57) ABSTRACT

A method and system for communication of information in OFDM format are disclosed. The method employs multi-symbol encapsulation (MSE), wherein multiple OFDM symbols are grouped together in cyclic frames having a single cyclic guard portion, for example a cyclic prefix, with multiple OFDM symbols sandwiched between each two consecutive cyclic guard portions. All OFDM symbols of one frame are equalized together at the receiver in a frequency domain using a single DFT/IDFT operation sequence. Embodiments of the MSE OFDM system are disclosed enabling high bandwidth efficiency, high tolerance to carrier frequency offset and low peak-to-average power ratio.

20 Claims, 11 Drawing Sheets

MULTI-SYMBOL ENCAPSULATED OFDM SYSTEM

CROSS-REFERENCE TO RELATED APPLICATIONS

This application claims priority of U.S. Provisional Patent Application No. 60/506,174 filed Sep. 29, 2003, entitled "Multi-Symbol Encapsulated OFDM System with Improved Bandwidth Efficiency", which is incorporated herein by reference for all purposes.

FIELD OF THE INVENTION

The present invention relates to communication systems using OFDM transmission format, and more specifically to formatting an OFDM signal for improving system performance in the presence of linear channel distortion.

BACKGROUND OF THE INVENTION

Orthogonal frequency division multiplexing (OFDM) has received considerable attention for its robustness against inter-symbol interference (ISI) and impulse noise, low implementation complexity and high spectral efficiency. It was first standardized for Digital Audio and Video Broadcasting applications, and later for digital subscriber loops (DSL) and wireless LAN. One important advantage of an OFDM system is its simple receiver structure utilizing a frequency domain equalizer with only one complex multiplication per sub-carrier. This is achieved by inserting a time domain cyclic prefix (CP) in front of each OFDM symbol, enabling the receiver to separate a steady-state response from a transient response of the communications channel. The CP, which is a cyclic extension of the inverse discrete Fourier transformation (IDFT) output, has to be at least as long as the channel impulse response (CIR) in order to avoid inter-symbol interference. Therefore, redundancy is unavoidably introduced into conventional OFDM systems. This restricts achievable bandwidth efficiency, especially for channels with a very long CIR.

To mitigate this problem, many OFDM receivers apply a finite-impulse response (FIR) time domain equalizer (TEQ) before the discrete Fourier transform (DFT) in order to shorten the effective length of the CIR. However, this significantly undermines the major advantage of OFDM, i.e., the simple frequency domain equalization.

Further, conventional OFDM transmission is known to be sensitive to synchronization errors, represented by frequency and timing offsets. Frequency offset at the receiver introduces inter-carrier interference (ICI) due to the loss of orthogonality among demodulated sub-carriers. Timing offset results in a rotation of the OFDM sub-carrier constellation. As a result, an OFDM system cannot recover the transmitted signal without a near perfect synchronization, especially when a high-order quadrature amplitude modulation (QAM) of the sub-carriers is used.

Another disadvantage of the conventional OFDM transmission is its high peak-to-average power ratio (PAPR). As a result, OFDM signals cover a wide range of amplitudes but dwell mostly at small values. The disadvantages caused by this are twofold. As only the linear region of the amplifier can be used, high PAPR means low efficiency of the amplifier. On the other hand, OFDM signals have to be normalized to the conversion range of digital-to-analog (D/A) and analog-to-digital (A/D) converters for transmission and signal processing purposes. For a given quantization word length, a higher PAPR implies a lower signal-to-quantization-noise ratio.

The instant invention provides a new and simple multi-symbol encapsulated (MSE) OFDM system which employs a different type of cyclic prefix; instead of using one cyclic prefix for each OFDM symbol, a number of OFDM symbols are grouped together as a frame and protected by one single cyclic prefix. Two different frame implementations can be realized for different purposes, i.e., either to improve the bandwidth efficiency or to improve the robustness to synchronization errors and to reduce the PAPR of the MSE-OFDM system, as illustrated in FIGS. 2 and 8. These two different systems are named CP-reduced and FFT size-reduced MSE-OFDM system, respectively.

H. Sari, et al. in an article "Transmission Techniques for Digital Terrestrial TV Broadcasting," *IEEE Commun. Mag.*, vol. 33, no. 2, February 1995, pp. 100-109, and D. Falconer et al. in an article "Frequency domain equalization for single-carrier broadband wireless systems", IEEE Communications Magazine, Volume: 40, Issue: 4, April 2002 Pages: 58-66, disclosed grouping multiple single carrier symbols into a frame followed by a cyclic prefix to facilitate frequency-domain equalization in single carrier systems. This approach essentially emulates the time-domain signal structure of the conventional OFDM system by providing a cyclic data frame at least several times longer than the channel response time; using a cyclic prefix in a single-carrier system for each symbol would be impossible because of a very short duration of the single-carrier symbol in a system having a comparable bit rate.

Encapsulating multiple OFDM symbols with a single cyclic prefix in one OFDM frame has not been disclosed heretofore; conventional OFDM systems already provide a cyclic frame structure enabling frequency-domain equalization. However, the multi-symbol encapsulation of OFDM symbols in a cyclic OFDM frame with a single cyclic guard portion would provide additional benefits compared to prior-art OFDM systems and the system of H. Sari et al., by potentially improving the bandwidth efficiency, enhancing system's robustness to synchronization errors and suppressing digitization noise through PAPR reduction.

It is therefore an object of this invention to provide a method for OFDM transmission wherein a high bandwidth efficiency is achieved by encapsulating multiple OFDM symbols in a frame with a single cyclical prefix.

It is another object of this invention to provide a method of a multi-symbol encapsulated (MSE) OFDM transmission with low peak-to average power ratio and enhanced tolerance to frequency synchronization errors.

It is another object of this invention to provide an MSE-OFDM system having high bandwidth efficiency.

It is another object of this invention to provide an MSE system for OFDM transmission having low peak-to average power ratio and enhanced tolerance to frequency synchronization errors.

SUMMARY OF THE INVENTION

In accordance with the invention, a communication system for transmitting information in an OFDM format is provided, comprising at least one of (a) an OFDM transmitter for transmitting a multi-symbol encapsulated OFDM signal along a transmission channel, and (b) an OFDM receiver for receiving the multi-symbol encapsulated OFDM signal from a transmission channel, wherein the multi-symbol encapsulated OFDM signal comprises a sequence of OFDM frames bearing the information, each said frame including a sequential plurality of OFDM symbols and only one cyclic guard portion, said cyclic guard portion appended at one end of the frame and replicating an opposing end of the frame, and wherein the multi-symbol encapsulated OFDM signal has at least two OFDM symbols between each two consecutive guard portions.

In accordance with one embodiment of the invention, the communication system comprises the OFDM transmitter for transmitting a multi-symbol encapsulated OFDM signal, said transmitter including: a multi-symbol encapsulator for converting an input sequence of m-ary data symbols into a sequence of the OFDM frames, a D/A converter for converting the sequence of OFDM frames into an OFDM signal waveform, and an RF transmitter for transmitting the OFDM signal waveform along a transmission channel.

In accordance with another embodiment of the invention, the communication system includes the OFDM receiver for receiving the multi-symbol encapsulated OFDM signal transmitted along the transmission channel, said OFDM signal further comprising a preamble sequence having a pre-determined structure, wherein the OFDM receiver comprises: (a) an A/D converter for sampling the received OFDM signal at a sampling frequency and for producing a sequence of received waveform samples; (b) a synchronization and channel estimation unit adapted to identify the preamble sequence in the sequence of received waveform samples and to perform channel and frequency offset estimation from the received preamble sequence and the pre-determined structure of the preamble sequence; (c) a cyclic guard removing unit adapted to identify information-bearing OFDM frames in the sequence of received waveform samples, to remove the cyclic guard portions from each identified OFDM frame and to produce a sequence of guard-removed OFDM frames; (d) a channel equalizer, comprising: a first processing unit adapted to perform an M×N points DFT and M×N complex multiplications for converting the guard-removed OFDM frames to frequency domain, and for frequency-domain equalization to produce a sequence of equalized frame spectra, and a second processing unit adapted to perform an M×N point inverse DFT on each equalized frame spectrum to produce a sequence of equalized guard-less OFDM frames, each comprising M OFDM symbols; (e) a third processing unit adapted for splitting the equalized frame into M OFDM symbols, performing M N-point inverse DFTs for demodulating the equalized guard-less OFDM frames and for producing a set of M×N received m-ary symbols from each equalized OFDM frame; and (f) a parallel-to-serial converter adapted to convert the set of M×N received m-ary symbols into a received sequence of m-ary data symbols.

In accordance with another aspect of this invention, a method for an OFDM transmission is provided comprising the step of forming an OFDM signal comprising a sequence of OFDM symbols and a sequence of cyclic guard portions, the OFDM signal having at least two OFDM symbols between each two consecutive cyclic guard portions, wherein the cyclic guard portions replicate end portions of OFDM symbols.

In one embodiment of this aspect of the invention, the step of forming a sequence of multi-symbol OFDM frames by performing the steps of: (a) providing an input sequence of m-ary data symbols; (b) dividing the input sequence of m-ary data symbols into subsets of N m-ary data symbols, wherein N>1; (c) performing frequency domain multiplexing of each subset of N m-ary data symbols by modulating N frequency subcarriers therewith and using an N-point inverse DFT for producing N waveform samples forming an N-point OFDM symbol; (d) grouping the N-point OFDM symbols into ordered sets of M OFDM symbols, the ordered sets forming data sections of the frame, wherein M>1; (e) forming a multi-symbol OFDM frame from each ordered set of M OFDM symbols by appending a cyclic guard portion at an end of the data section of the frame, the cyclic guard portion replicating an opposing end portion of the frame and having P waveform samples.

One embodiment of the method of present invention provides OFDM frames having a length exceeding the length of the channel impulse response by at least a factor of 30 for providing high bandwidth efficiency.

Another embodiment of the method of present invention provides OFDM frames having a length exceeding the channel impulse response length by at most a factor of 16, and comprising each at least 4 OFDM symbols for providing at least one of: reduced frequency offset sensitivity of the OFDM system, and reduced PAPR.

BRIEF DESCRIPTION OF THE DRAWINGS

Exemplary embodiments of the invention will now be described in conjunction with the drawings in which.

DETAILED DESCRIPTION OF THE PREFERRED EMBODIMENTS

Figure 1A:
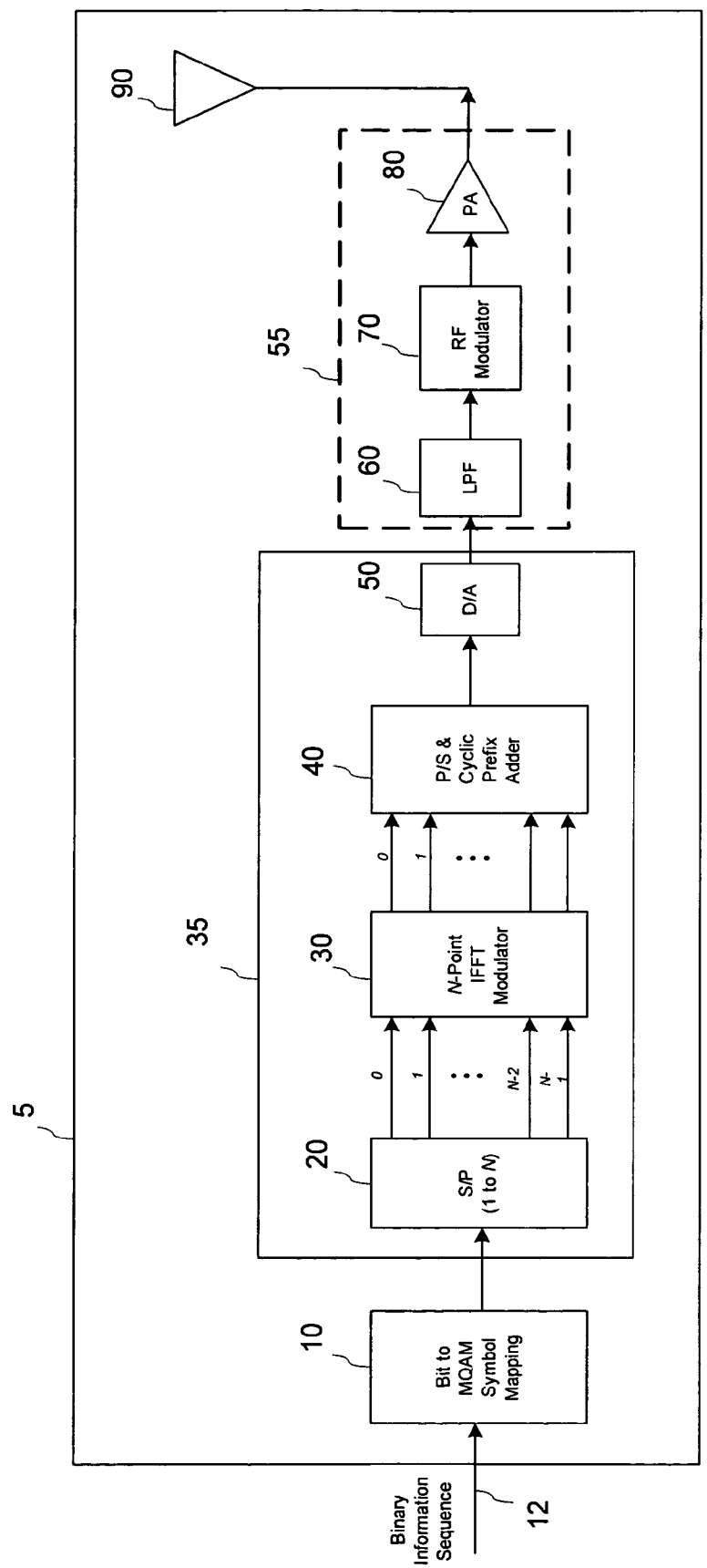
FIG. 1A is a block diagram of a prior-art OFDM transmitter.

Before providing a detailed description of exemplary embodiments of an OFDM transmission system and method of the present invention, general principles of OFDM transmission will be briefly discussed with reference to FIGS. 1A and B, showing a prior-art OFDM transmitter and receiver respectively. A detailed description of a typical prior-art OFDM system can be found for example in U.S. Pat. No. 5,732,113 issued to Schmidl et al, which is incorporated herein by reference.

An OFDM transmitter 5 receives an input binary information sequence 12. The binary sequence 12 is fed into an encoder 10, which converts it into an input sequence of m-ary data symbols X(k). A sequence of N m-ary data symbols X(k) is then passed onto an OFDM symbol generator 35, typically comprising a serial-to parallel converter 20, a digital signal processor (DSP) 30, and a parallel-to-serial converter and CP adder 40. The digital signal processor (DSP) 30 is programmed to perform an inverse discrete Fourier transform (IDFT) or, preferably, an inverse fast Fourier transform (IFFT) on the input sequence of N complex m-ary data symbols.

Encoder 10 typically performs an m-ary quadrature amplitude modulation (MQAM) encoding of consecutive sub-segments of v input bits, $m=2^v$, mapping thereby segments of v bits to predetermined corresponding complex-valued points in an m-ary constellation. Each complex-valued point in the constellation represents discrete values of phase and amplitude. The sequence of N m-ary data symbols is used then by the IFFT processor 30 as frequency-domain complex modulation coefficients for modulating N frequency-domain sub-carriers, thereby forming an N-point OFDM symbol defined as $$x(n) = \frac{1}{\sqrt{N}} \sum_{k=0}^{N-1} X(k) e^{j2\pi \frac{nk}{N}} \qquad n = 0, 1, 2, \ldots, N-1. \tag{1}$$

Encoder 10 may also use a block and/or convolutional coding scheme to introduce error-correcting and/or error-detecting redundancy into each segment of v×N bits and then sub-divide the coded bits into N sub-segments of v bits. The integer v typically ranges from 2 to 6.

The OFDM symbol defined by the equation (1) is then passed onto the parallel-to-serial converter 40 which converts the OFDM symbol into a time domain, where it is represented by a sequence of N digital samples spaced by time intervals $t_s=T/N$, where T is a duration of one time-domain OFDM symbol, which corresponds to frequency spacing between subcarriers $f=1/T$.

As a result of the discrete-valued modulation of the OFDM sub-carriers in frequency domain by the m-ary data symbols over OFDM symbol intervals of T seconds, the OFDM sub-carriers each display a sinc(x)=sin(x)/x spectrum in the frequency domain. By spacing each of the sub-carriers 1/T Hz apart in the frequency domain, the primary peak of each sub-carrier's sinc(x) spectrum coincides with a null of the spectrum of every other sub-carrier. In this way, although the spectra of the sub-carriers overlap, they remain orthogonal to one another.

The parallel-to-serial (P/S) converter 40 performs also another important function—it extends the time-domain OFDM symbol by appending a cyclic prefix (CP) at the beginning of each OFDM symbol to protect it from channel-induced inter-symbol interference (ISI). ISI typically appears due to multi-path interference of the OFDM signal during channel propagation causing a channel delay spread. Duration of the CP exceeds the delay spread X to protect the symbol from the ISI. The CP is typically a copy of an end portion of the symbol appended at the beginning of the symbol. Alternatively, the CP can be a copy of a portion of the beginning of the symbol appended to an opposing end of the symbol. The CP will be also referred to hereafter in this specification as a cyclical guard portion.

In prior-art systems, the CP is appended in front of each OFDM symbol to protect each symbol from ISI, and its length P, i.e. a number of waveform samples therein, is selected so that P exceeds a channel impulse response length $L=\tau/t_s$. The delay spread $\tau$ can be determined by estimating a decay time of the channel impulse response h(t) at the receiver. Obviously, adding the CP to each symbol decreased bandwidth efficiency of the OFDM transmission by a factor $z=N/(P+N)$.

The cyclically extended digital time-domain OFDM symbols are then passed to a digital-to-analog converter 50 to produce an analog OFDM signal which is then fed into an RF transmitter 55. Many variations of the RF transmitter 55 exist and are well known in the art, but typically, the RF transmitter 55 includes a low-pass filter 60, an RF modulator 70 typically comprising an RF local oscillator wherein the signal is frequency up-converted to an RF central frequency, a power amplifier 80 and an antenna 90. Typical embodiments of modules 50, 60, and 70 can be found in U.S. Pat. No. 5,732,113.

In order to receive the OFDM signal and to recover the input data bits that have been encoded into the OFDM sub-carriers at a remote location, an OFDM receiver must perform essentially the inverse of all the operations performed by the OFDM transmitter described above. These operations can be described with reference to FIG. 1B, which is a block diagram of a typical OFDM receiver according to the prior art.

Through antenna 15, a received OFDM signal is fed into an analog-to-digital converter 25 where it is down-converted in frequency to remove the RF carrier from the signal and digitized at a sampling rate $f_s$ to produce discrete-time waveform samples of the received OFDM signal. The difference between the downshifting frequency $f_c'$ of the receiver and the carrier frequency $f_c$ of the transmitter is the frequency offset, $\Delta f=f_c-f_c'$, which should be equal to zero in an ideal receiver; nonzero frequency offset can lead to inter-carrier interference (ICI) and transmission errors.

The output of the A/D converter 25 is then delivered to DSP 35 as a complex-valued OFDM signal r(n), where index n represents digitized time samples. DSP 35 identifies OFDM symbol boundaries in the received sequence of waveform samples r(n), splits it into cyclic-extended OFDM symbols, removes the cyclic prefixes from each such symbol, and performs serial-to-parallel 1 to N conversion of the received and digitized OFDM signal, producing a parallel stream of N complex waveform samples. The DSP 35 can also perform additional operations on the samples of the received OFDM signal, which may include for example synchronizing D/A converter to the timing of the symbols and data samples within the received OFDM signal, and estimating and correcting for the carrier frequency offset of the received OFDM signal. The parallel sets of N complex waveform samples are then passed onto a DSP 45 programmed to perform an N-point DFT, typically—FFT, performing simultaneously frequency-domain equalization, typically done by multiplying the computed Fourier coefficients R(k) for each k-th sub-carrier, k=0, . . . N−1, by an inverse of an estimated channel transfer function H(k) at a corresponding sub-carrier frequency.

DSP 45 thus computes a sequence of equalized frequency-domain MQAM symbols, $R_{EQW}(k)$, from each symbol of the OFDM signal by demodulating the sub-carriers of the OFDM signal by means of the FFT calculation. DSP 45 then delivers these sets of MQAM symbols to a parallel-to-serial converter 55 producing a sequence of the MQAM symbols, which is finally passed to a MQAM decoder 65 which outputs an output binary sequence reproducing the input binary sequence. This recovery is performed by decoding the frequency-domain MQAM symbols to obtain a stream of data bits 104 which should ideally match the stream of data bits 12 that were fed into the OFDM transmitter 5. This decoding process can include soft Viterbi decoding and/or Reed-Solomon decoding, for example, to recover the data from the block and/or convolutionally encoded m-ary data symbols.

A typical feature of the aforedescribed prior-art OFDM transmission system is the use of a cyclic prefix (CP) which is appended at the beginning of each OFDM symbol to combat ISI. This CP should be at least as long as the length of the channel CIR to shield the OFDM symbols from the channel-induced ISI; however, having the CP attached to each symbol decreases a bandwidth efficiency of the OFDM transmission by a factor of $z=N/(P+N)$. For channels with a long impulse response, this penalty in bandwidth efficiency can be significant, as the length of one OFDM symbol is typically limited by carrier spacing and peak to average power ratio (PAPR), as the carrier spacing cannot be too small and PAPR cannot be too large.

Exemplary embodiments of a communication system and method for transmitting information in OFDM format will now be discussed with reference to FIGS. 2-7.

A principal feature of the OFDM transmission system of present invention is the use of multi-symbol encapsulation, wherein multiple OFDM symbols are grouped together in a frame which includes a single cyclic prefix, or more generally—a single cyclic guard portion having a length that preferably exceeds the CIR length. This cyclic guard portion can be attached either at the beginning of the frame before the first OFDM symbol of the frame forming thereby the cyclic prefix, or after the frame following the last OFDM symbol of the frame forming a cyclic suffix (CS).

Figure 2A:
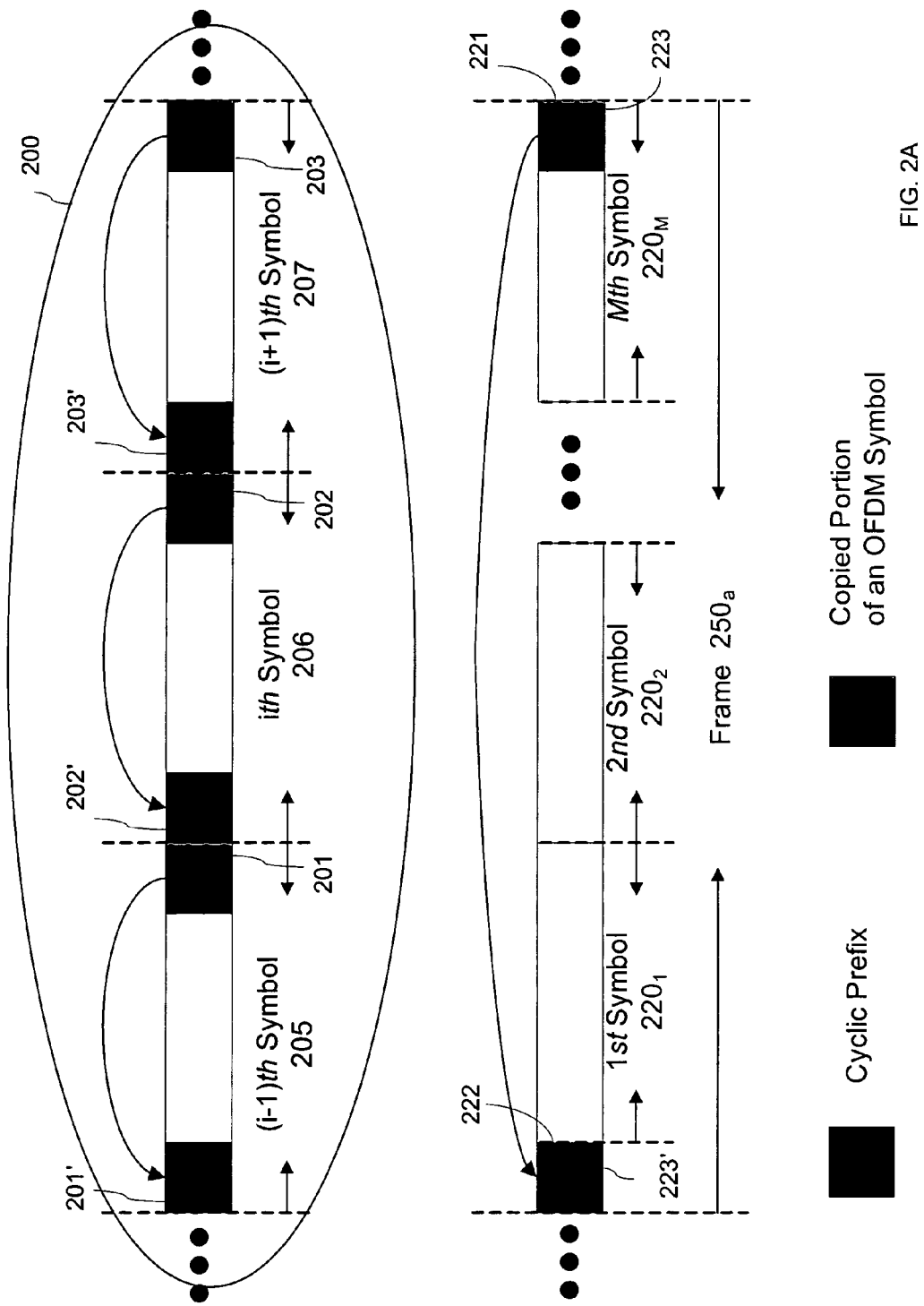
FIG. 2A is a diagram of an MSE-OFDM frame for a CP-reduced transmission system in comparison with a conventional OFDM signal structure.
Figure 2B:
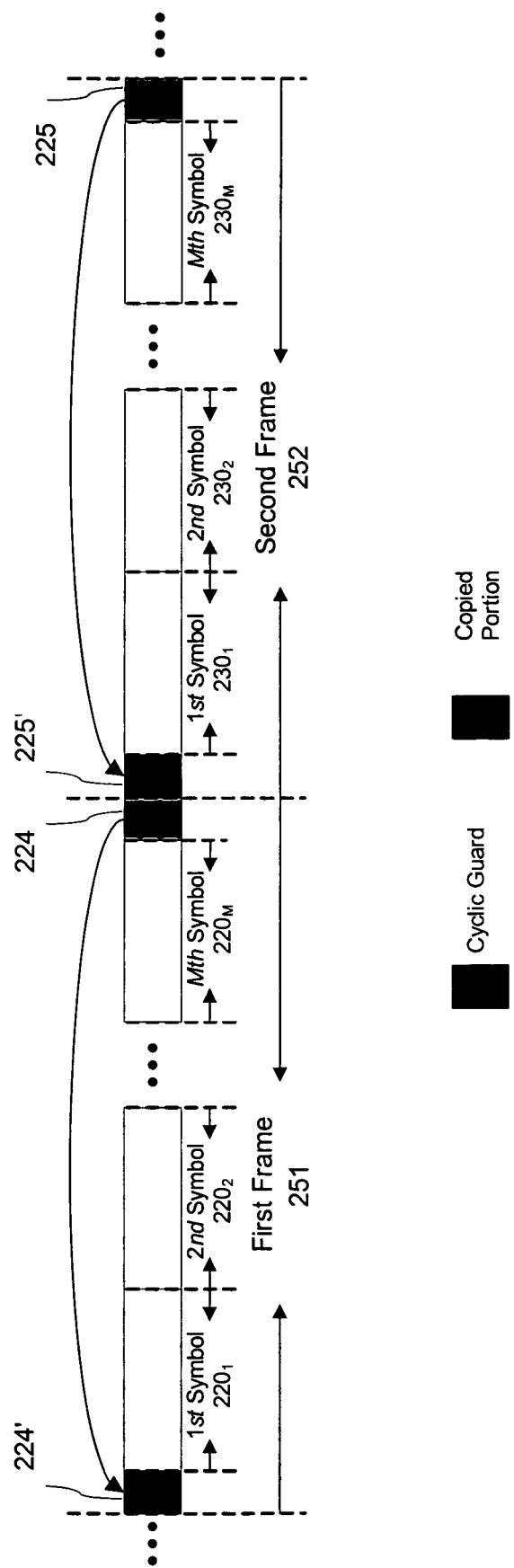
FIG. 2B is a diagram of an MSE-OFDM frame sequence wherein cyclic guard portions replicate frame portions which are not part of a data section of the frame.

Hereinafter in this specification, we will be referring to the OFDM frame as having two opposing ends rather than a beginning and an end; this is illustrated in FIG. 2A wherein the frame 250a has two opposing ends 221 and 222, and two corresponding opposing end portions 223 and 223'. This terminology allows expressing more clearly similarity between frames having a CP and a CS, and is equally applicable to a frame converted in a parallel format, which will be discussed hereafter in this specification.

If the CIR length L, which is in the context of this specification defined in relative terms as $L=N\tau/T<P$, where $\tau$ is a characteristic decay time of the CIR, T is a duration of one OFDM sample and N is the size of the DFT used to form the OFDM symbol, the effect of the channel on the OFDM signal will be very similar to an effect of the channel on an OFDM signal wherein the OFDM symbol is periodically repeated that can be described by a cyclic convolution. This allows the use of FFT-assisted frequency-domain equalization to remove linear channel-induced distortions such as ISI from the received signal, as the FFT is equivalent to an inverse of cyclic convolution. Making the signal appear periodic by inserting a cyclic guard portion at one of two ends of a frame is therefore essential for proper use of FFT for frequency-domain equalization; in that instance, the effect of ISI, or any linear channel distortion, can be removed from the received signal by FFT-assisted frequency-domain equalization without attaching a cyclic prefix to each symbol. This frequency-domain equalization however needs to be performed on a whole frame rather than on each symbol, increasing therefore the required FFT size. This should not pose a significant problem for many applications due to commercial availability of fast DSP processors capable of performing FFT operations on large number of samples.

In the following description, N and M denote the size of the inverse DFT modulator, preferably embodied as an IFFT modulator, and the total number of OFDM symbols in one MSE-OFDM frame, respectively. The length of the cyclic guard portion is P samples. To illustrate the use of the cyclic guard portion in the MSE-OFDM signal structure of the instant invention, the time-domain frame structures of a conventional OFDM system and of one embodiment of the MSE-OFDM system are shown in FIG. 2A. As explained earlier in the specification, in the MSE-OFDM system of the present invention only one cyclic prefix 223' is used for a group of consecutive time-domain OFDM symbols $220_1$, $220_2$-$220_M$, which form a data section of the frame. In this embodiment, the cyclic prefix 223' is the cyclic extension of the last OFDM symbol $220_M$ in the same frame, i.e. a copy of its end portion 223 appended to the opposing end 222 of the frame. Alternatively, in another embodiment the first P samples of the OFDM symbol $220_1$ are copied and the copy appended at the opposing end 221 of the frame forming a cyclic suffix. In another embodiment shown in FIG. 2B, the cyclic guard portions 224' is a copy, or a replica, of an opposing end portion 224 of the frame 251, wherein the opposing end portion of the frame 224 is a sub-sequence of waveform samples which is not a part of any of the OFDM symbols $220_1$, ... $220_M$ forming the data section of the frame, but can be for example a training sequence.

Figure 2C:
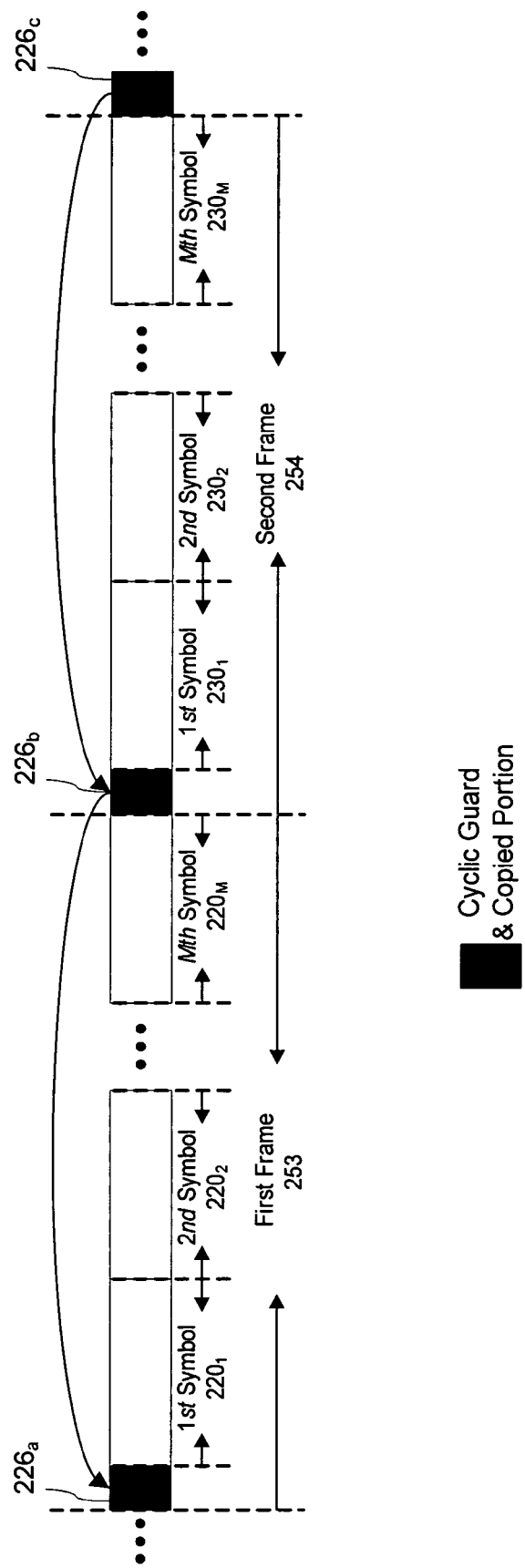
FIG. 2C is a diagram of an MSE-OFDM frame sequence having identical cyclic guard portions.

With reference to FIG. 2C, in other embodiment the cyclic guard portion of a frame is a copy of an end portion of an adjacent frame; e.g. the cyclic guard portion 226a of a frame 253 is a copy of a cyclic guard portion 226b of the preceding frame 254, and the cyclic guard portion 226b replicates a cyclic guard portion 226c of its preceding frame. In this embodiment, all cyclic guard portions are substantially identical and can be used as training sequences.

Figure 1B:
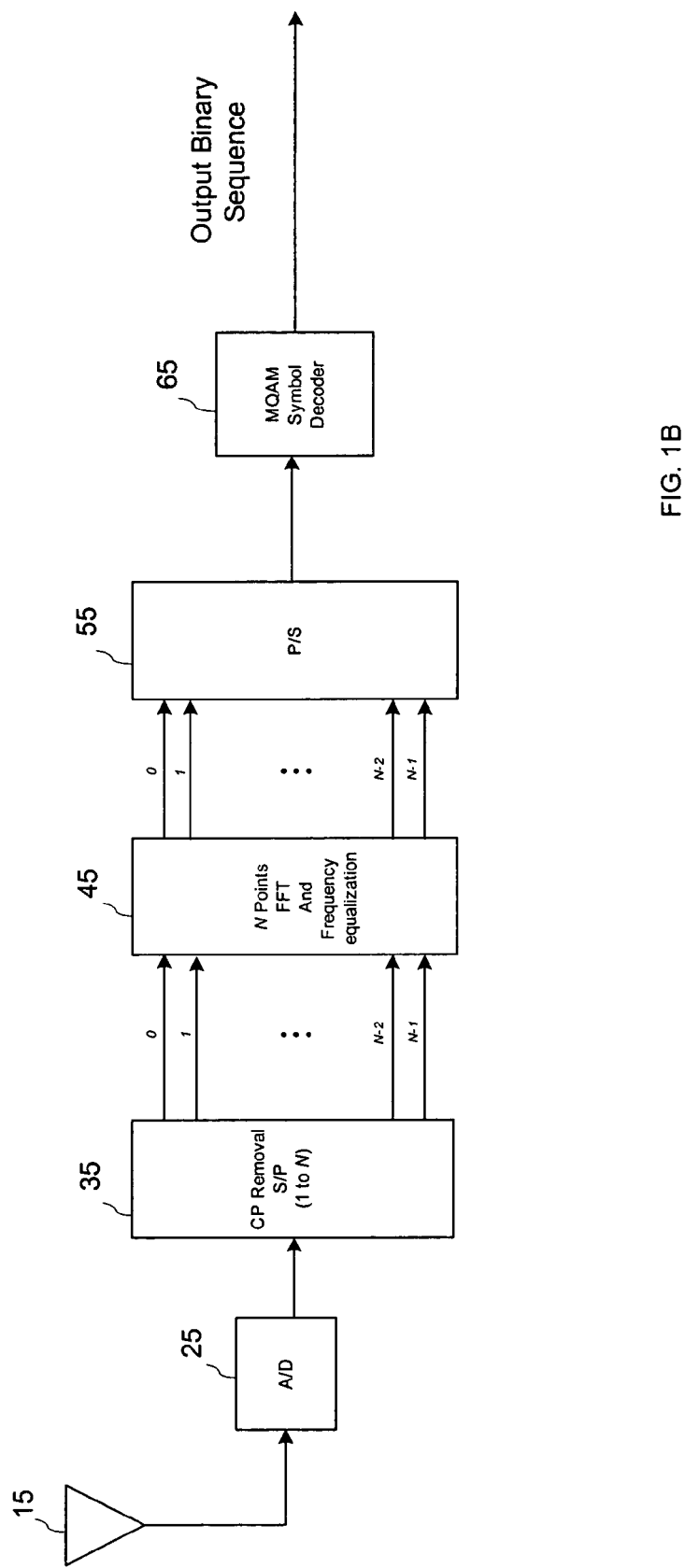
FIG. 1B is a block diagram of a prior-art OFDM receiver.

To support the novel MSE-OFDM frame structure shown in FIG. 2, modifications have to be made to both the aforedescribed prior art OFDM transmitter and the prior art OFDM receiver shown in FIGS. 1A and 1B.

Figure 3:
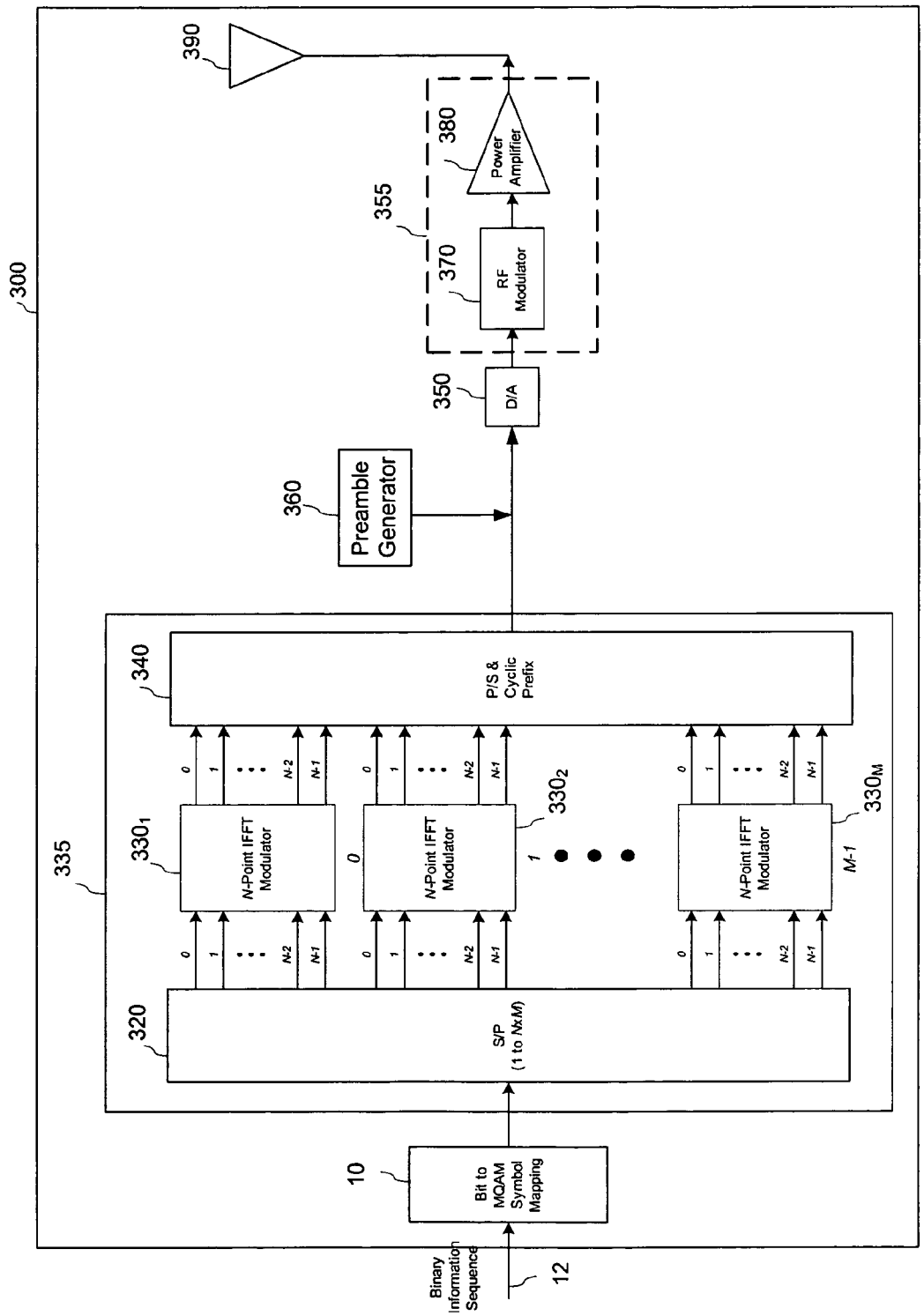
FIG. 3 is a block diagram of an OFDM transmitter with a parallel encapsulator according to instant invention.

FIG. 3 shows a block diagram of an exemplary embodiment of the MSE-OFDM transmitter generating a CP-extended OFDM frame; with minimal modifications that would be obvious to those skilled in the art, the transmitter shown in FIG. 2 can be adopted to generate a CS-extended frame.

Each block in the diagram shown in FIG. 3 is a functional unit of the OFDM transmitter adopted to perform one or several steps of the method of OFDM transmission of the present invention in one embodiment thereof; these steps will be also hereinafter described in conjunction with the description of the corresponding functional blocks of the transmitter.

Similar to the conventional OFDM transmitter of prior art shown in FIG. 1A, the MSE-OFDM transmitter 300 has at its input the encoder 10 that converts the input binary sequence 12 into the input sequence of m-ary data symbols $X(k)$, typically in MQAM format, which are used as complex modulation coefficients to modulate the frequency-domain sub-carriers of the OFDM signal in accordance with equation (1). However, M OFDM symbols have to be generated before the CP insertion at the transmitter side. The OFDM symbol generator 35 of the prior art transmitter is therefore replaced by a multi-symbol encapsulator 335, which includes a 1 to (N×M) serial-to-parallel converter 320, M N-point IFFT modulators $330_1$, $330_2$-$330_M$ which can be embodied as M DSP units programmed to perform N-points FFT or, preferably, as a single DSP unit, and a serial-to-parallel converter 340. A main function of the mutli-symbol encapsulator 335 is to receive the input sequence $X(k)$ and to convert it into an output sequence of multi-symbol cyclically-extended OFDM frames 250. Accordingly, the S/P converter 320 converts the input stream of m-ary symbols $X(k)$ into an (N×M) parallel stream, splits it into M N-point groups of the m-ary data symbols, and passes said groups onto M N-point IFFT modulators $330_1$, $330_2$-$330_M$, each of which functions similarly to the IFFT modulator 30 of the prior art OFDM transmitter 5 to produce an N-point OFDM symbol. The IFFT modulators $330_1$, $330_2$-$330_M$ together produce a parallel stream of M groups of N complex time-domain modulation coefficients $s_i(n)$, hereinafter also referred to as complex waveform samples, forming M OFDM symbols, which are then converted in a serial form by the P/S converter 340 to form a time-domain M-symbol OFDM frame.

The P/S converter 340 also performs the function of adding a cyclic prefix 223' to the frame, by copying the end portion 223 of the frame and appending the copy at the beginning of the frame as explained above in this specification, to form a cyclical-extended OFDM frame, outputting a sequence of cyclic-extended OFDM frames 250.

An l-th cyclic-extended MSE-OFDM frame is described by the equation (2)

$$s_l = \sum_{k=0}^{N-1} X_{l,M-1}(k)\psi_1(n,k) + \sum_{i=0}^{M-1}\sum_{k=0}^{N-1} X_{l,i}(k)\psi_2(n-iN-P,k) \quad (2)$$

where the two subscripts $i \in [0, M-1]$ and l mean the i-th OFDM symbol of the l-th frame. $\psi_1(n,k)$ and $\psi_2(n,k)$ are two rectangular signal multiplexing window functions corresponding to the cyclic prefix and the M information carrying OFDM symbols defined as follows $$\psi_1(n,k) = \begin{cases} \frac{1}{\sqrt{N}} e^{\frac{j2\pi k(N-P+n)}{N}}, & 0 \le n \le P-1 \\ 0, & \text{elsewhere} \end{cases} \quad (3)$$

and $$\psi_2(n-iN-P,k) = \begin{cases} \frac{1}{\sqrt{N}} e^{\frac{j2\pi k(n-P-iN)}{N}}, & P \le n \le MN+P-1 \\ 0, & \text{elsewhere} \end{cases} \quad (4)$$

The sequence of cyclically extended digital time-domain OFDM frames described by equation (2) forms an output of the P/S converter and CP adder 340, which is passed onto the D/A converter 350 to produce an analog OFDM signal bearing the sequence of the OFDM frames, which is then fed into an RF transmitter 355. In the exemplary embodiment shown in FIG. 3, the RF transmitter 355 includes an RF modulator 370 for frequency up-conversion of the analog waveform outputted from the D/A converter 350 into the RF frequency range, a power amplifier 380 for amplifying the up-converted OFDM signal, and an antenna 390 for transmitting the OFDM signal along a transmission channel. Many variations of the RF transmitter 355 are known and can be used in this embodiment, as would be obvious to those skilled in the art.

Figure 4:
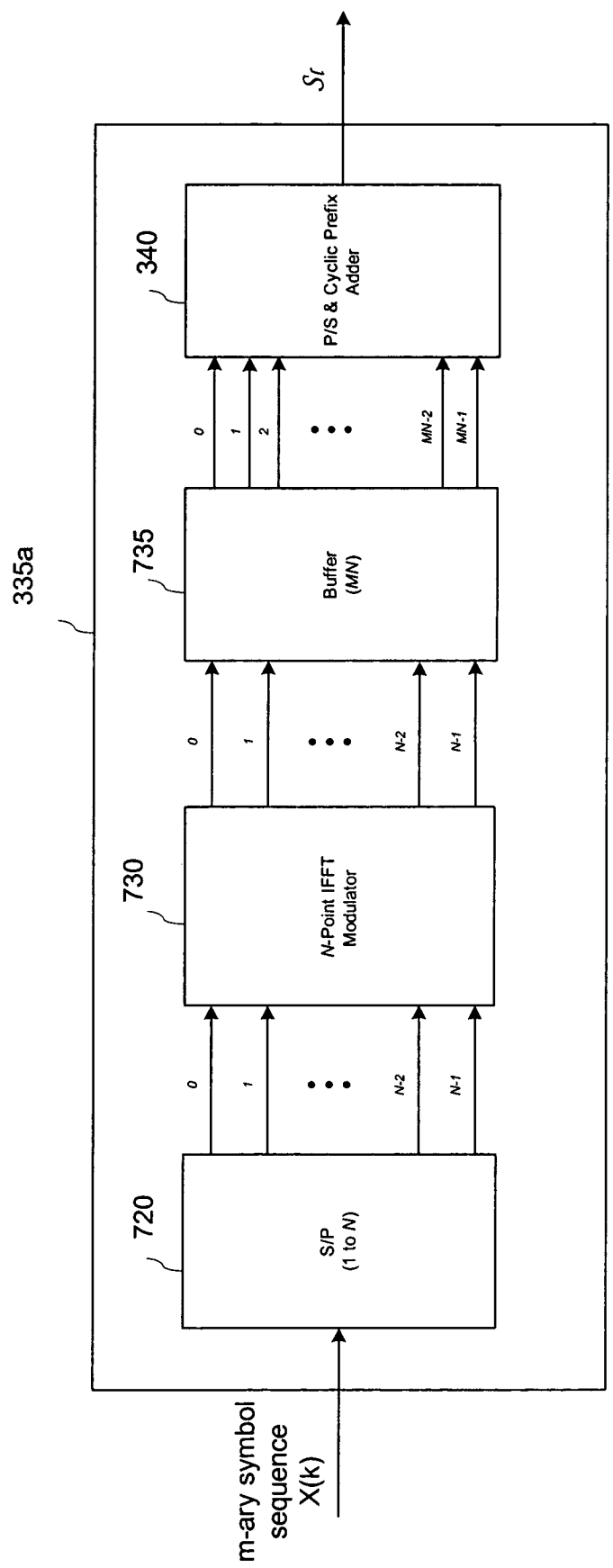
FIG. 4 is a block diagram of a serial multi-symbol encapsulator.

The aforedescribed embodiment of the MSE-OFDM transmitter of present invention includes the multi-symbol encapsulator 335 performing parallel DFT processing of N×M complex symbols, wherein all M symbols of one OFDM frame are formed simultaneously. FIG. 4 shows a block diagram of another embodiment of the multi-symbol encapsulator 335, labeled "335a", wherein the function of forming the OFDM frames is realized using a single N-point inverse DFT modulator 730, embodied as a DSP unit adapted to perform an N-point IFFT. The multi-symbol encapsulator 335a receives the input sequence of m-ary symbols X(n), preferably but not exclusively in MQAM format, and passes it to a serial-to-parallel converter 720, which converts the input sequence X(k) into a sequence of parallel N-symbol words formed by a sub-sequence of N consecutive m-ary symbols, and passes these words to the DSP unit 730, wherein the m-ary symbols from each word are used as modulation coefficients to form an N-point OFDM symbol x(n) using the N-point IFFT; up to this point, the system is similar to a corresponding section of the prior art system shown in FIG. 1. Next, the N complex waveform samples forming the OFDM symbol x(n) are delivered to a memory buffer having a size sufficient to store at least M×N complex values, which is programmed to accumulate M×N complex waveform samples forming M consecutive OFDM symbols; the parallel set of M×N complex waveform samples is then passed to the P/S converter and CP adder 340 where they are converted in a serial format to form a time-domain M-symbol OFDM frame, and the CP is added at the beginning of the frame as described heretofore in this specification with reference to FIG. 3.

Instead of adding a cyclic prefix at the beginning of the frame as was mentioned before in this specification, a cyclic guard portion of the same length P replicating the first P samples of the first OFDM symbol of the frame can be equally added at the end of the frame, forming a cyclic suffix (CS). Using the CS in the MSE-OFDM system can be advantageous as it allows reducing the size of the buffer used in the OFDM transmitter.

Figure 5:
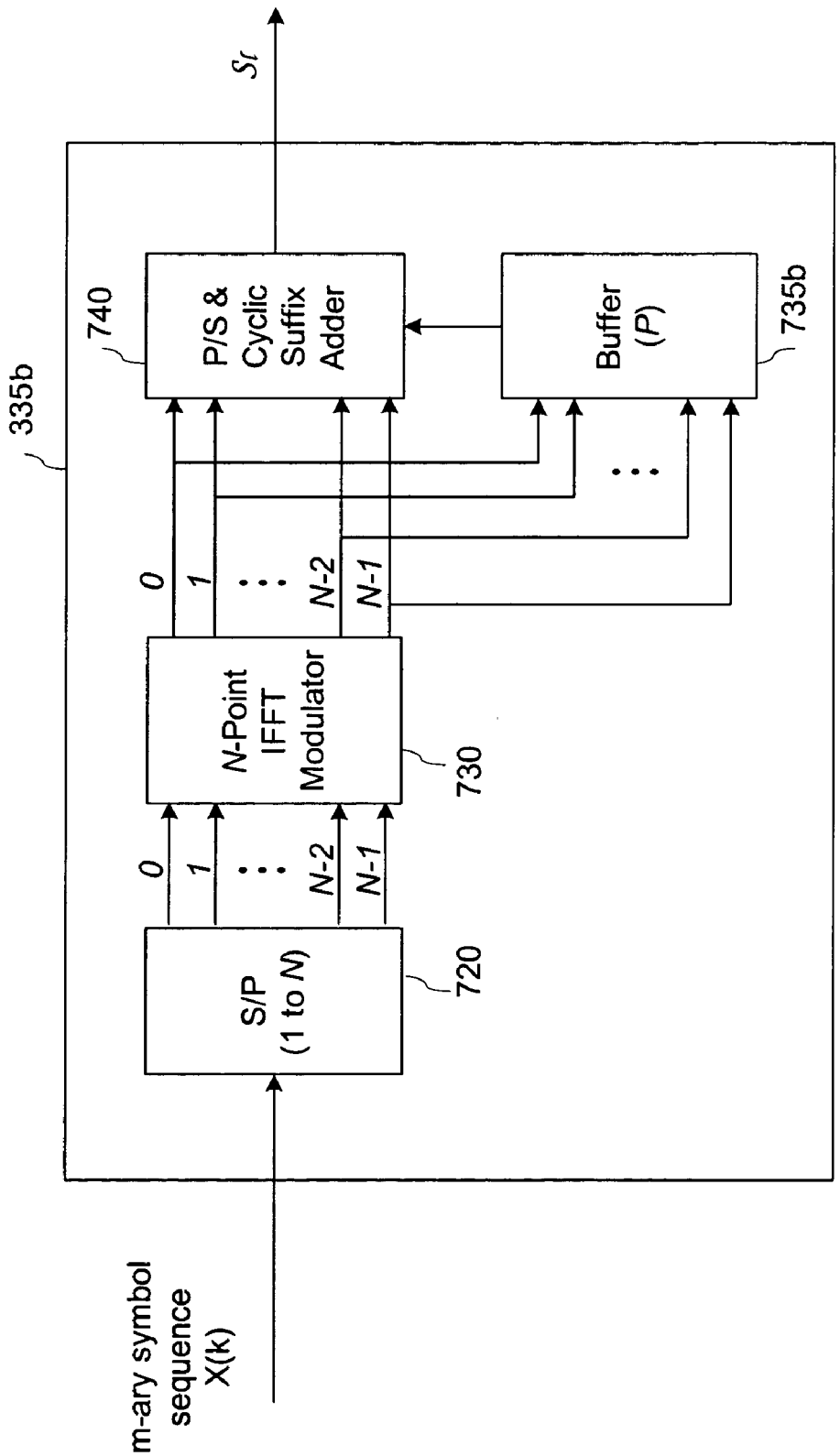
FIG. 5 is a block diagram of a serial multi-symbol encapsulator with a reduced buffer size.
Figure 6:
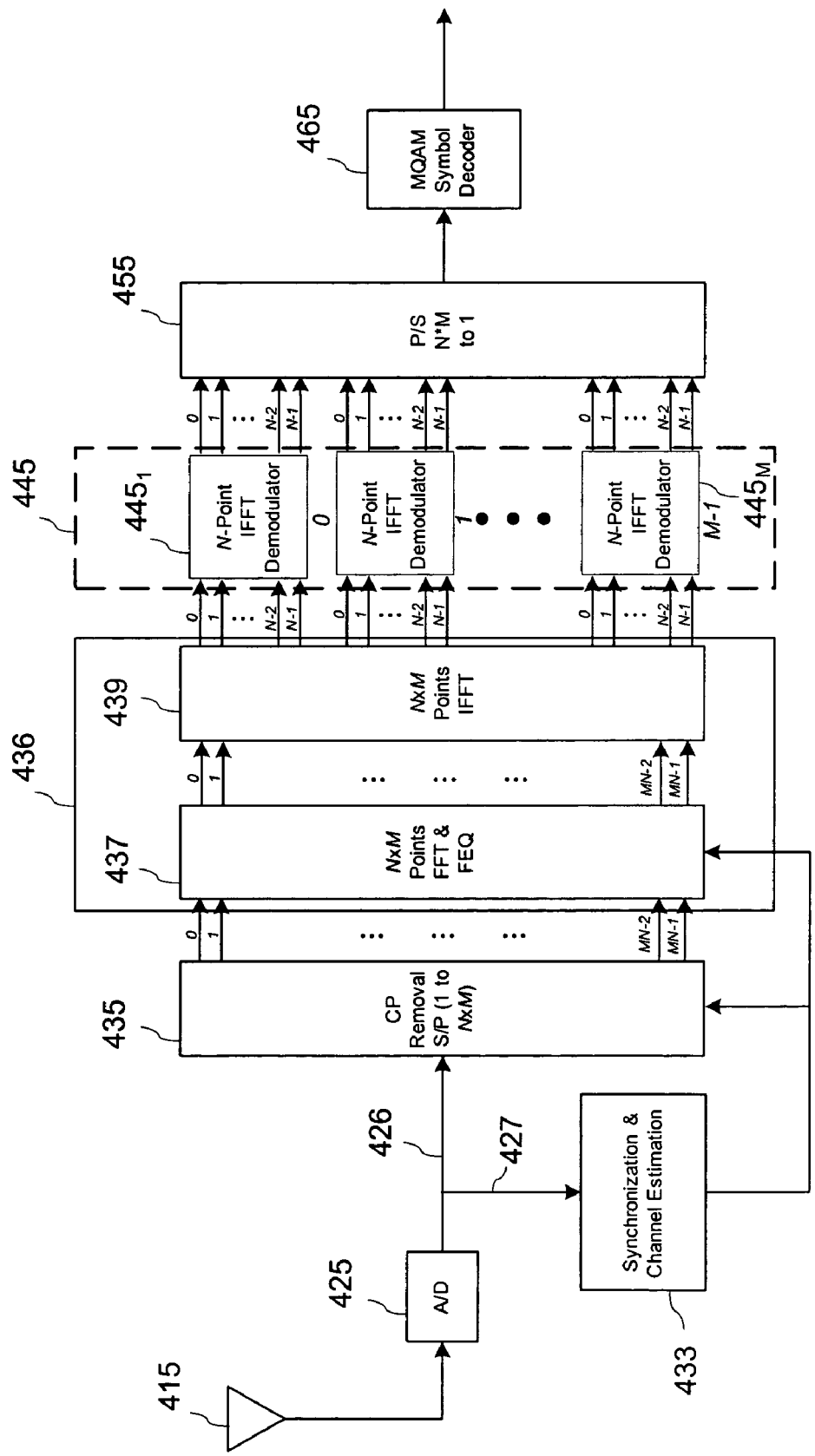
FIG. 6 is a block diagram of an OFDM receiver according to instant invention.

FIG. 5 shows a block diagram of another embodiment of the multi-symbol encapsulator in accordance with the instant invention. In this embodiment, the multi-symbol encapsulator 335b adds a cyclic suffix at the end of the word, which allows decreasing the memory size of the used buffer to the length P of the cyclic suffix. The first two blocks 720 and 730 of the multi-symbol encapsulator 335b are the same as in the previous embodiment shown in FIG. 4 and perform the same functions, outputting a sequence of parallel N-element sets of complex waveform samples each forming an OFDM symbol x(n). This output is sent to a memory buffer unit 735b capable of storing at least P complex waveform samples. The memory buffer unit 735b is programmed to count OFDM symbols produced by the N-point IFFT modulator 730, to store first P samples of every (1+jM) OFDM symbol in the sequence of OFDM symbols produced by the N-point IFFT modulator 730, where j=0, 1..., and to deliver them to a P/S converter and cyclic suffix adder 740 once a (j+1)Mth OFDM symbol arrives. The P/S converter and cyclic suffix adder 740 converts the sequence of N-point sets of complex waveform samples into a sequence of time-domain OFDM symbols. Additionally, after outputting every Mth OFDM symbol, it inserts in the output OFDM sequence the sequence of P samples received from the buffer 735b, thereby forming a cyclic suffix of an OFDM frame.

An exemplary embodiment of an MSE-OFDM receiver according to the instant invention is shown in FIG. 4 and will now be described. For clarity, the MSE-OFDM signal embodiment with a cyclic prefix will be assumed. However, only small modifications would be required to the receiver of this embodiment if a cyclic-suffix extend frame format is used instead, and these modifications would be obvious to those skilled in the art.

Each block in the diagram shown in FIG. 4 is a functional unit of the receiver adopted to perform one or several steps of the method of OFDM transmission of the present invention in one embodiment thereof; these steps will be also hereinafter described in conjunction with the description of the corresponding functional blocks of the receiver.

An RF antenna 415 receives the transmitted OFDM signal affected by the transmission channel, and passes it to an A/D converter 425. The RF antenna includes an RF receiver which is not shown and which also performs a function of frequency down-conversion to reverse the frequency up-conversion performed by the RF modulator 370. The difference between the downshifting frequency $f_c'$ of the receiver and the carrier frequency $f_c$ of the transmitter is the frequency offset, $\Delta f = f_c - f_c'$, which should be equal to zero in an ideal receiver; nonzero frequency offset can lead to inter-carrier interference (ICI) and transmission errors. Those skilled in the art would appreciate that different versions of the RF receiver exist that can be used in this embodiment.

The A/D converter 425 digitizes the received OFDM signal by sampling it at the sampling frequency $f_s$, to produce a sequence of received OFDM samples r(n), where index n marks individual OFDM samples in the time-ordered sequence r(n). As we mentioned before, the frequency offset here refers to carrier frequency offset, i.e., the difference between the downshifting frequency and the carrier frequency of the transmitter.

The output of the A/D converter 425 is then split into two data streams 426 and 427, each carrying the sequence of the received complex-valued OFDM samples. Stream 426 of the received OFDM samples is delivered to a cyclic guard removing unit 435, which is programmed to identify OFDM frame boundaries in the received sequence of OFDM samples r(n) using a timing synchronization signal supplied by a synchronization and channel estimation unit 433, to remove the cyclic prefix from each frame, and to perform serial-to-parallel 1 to (N×M) conversion of the received and digitized OFDM signal, producing a parallel stream of (N×M) complex waveform samples. This parallel stream is then passed to a channel equalizer 436.

The received OFDM samples are also fed into a synchronization and channel estimation unit 433 embodied as a DSP and adapted to generate timing information and to perform channel and frequency offset estimation. The DSP 433 supplies timing information to the A/D converter 425 and the cyclic guard removal unit 435. It also supplies an estimated channel transfer function H and an estimated frequency offset to the channel equalizer 436.

Channel equalization in the MSE-OFDM receiver is performed differently from the aforedescribed channel equalization in the prior art OFDM receiver; according to the present invention, the channel equalization is performed on a per-frame rather than per-symbol basis, and the channel equalization and OFDM de-modulation are performed in two different steps.

For each identified OFDM frame, the cyclic guard removal unit 435 produces a sequence of M×N received waveform samples forming a guard-removed OFDM frame and passes it to a channel equalizer 436 formed by a sequentially-connected first and second processing means 437, 439. Functioning of this channel equalizer will now be explained.

An OFDM frame sequence formed by the multi-symbol encapsulator 335 can be presented as a vector of size [MN+P] using the following equation (5):

A received and digitized OFDM frame sequence corresponding to the transmitted vector $s_l$ distorted by the transmission channel can be expressed through a matrix convolution equation as:

$$\bar{r}_l = \begin{bmatrix} h_0 & 0 & 0 & 0 & & & & & 0 & 0 & 0 \\ h_1 & h_0 & 0 & 0 & & \ldots & \ldots & & 0 & 0 & 0 \\ h_2 & h_1 & h_0 & 0 & \ldots & \ldots & & & 0 & 0 & 0 \\ & & & \vdots & & & & & & & \\ h_{P-1} & \ldots & h_2 & h_1 & h_0 & 0 & \ldots & & 0 & 0 & 0 \\ 0 & h_{P-1} & \ldots & h_2 & h_1 & h_0 & \ldots & & 0 & 0 & 0 \\ 0 & 0 & h_{P-1} & \ldots & h_2 & h_1 & h_0 & \ldots & 0 & 0 & 0 \\ 0 & 0 & 0 & h_{P-1} & \ldots & h_2 & h_1 & h_0 & \ldots & \ldots & 0 \\ & & & & \vdots & & & & & & \\ 0 & 0 & 0 & 0 & 0 & h_{P-1} & \ldots & & h_2 & h_1 & h_0 \\ 0 & 0 & 0 & 0 & 0 & 0 & h_{P-1} & \ldots & \ldots & h_2 & h_1 \\ 0 & 0 & 0 & 0 & 0 & 0 & 0 & h_{P-1} & \ldots & \ldots & h_2 \\ & & & & & \vdots & & & & & \\ 0 & 0 & 0 & 0 & 0 & 0 & 0 & \ldots & & 0 & h_{P-1} \end{bmatrix}$$

$$\bar{s}_l^T + w$$

(6)

where $\bar{s}_l^T$ is a transposed version of $\bar{s}_l$, and the size of the channel convolution matrix in the right hand side of equation (6) is [MN+2P, MN+P]; w is an additive white Gaussian noise (AWGN) vector having the same size as $s_l$.

Equation (6) assumes that the frequency offset is zero. A method for compensating the frequency offset will be discussed hereafter in this specification in conjunction with a description of functioning of the synchronization and channel estimation unit 433.

The received guard-removed OFDM frame $\tilde{r}_l$ produced by the cyclic guard removal unit 320 is a cyclic convolution between a CP-removed original frame vector $\tilde{s}_l$ and a CIR h when the AWGN noise is neglected. Therefore, the following DFT transform pair holds $$\tilde{r}_l \overset{\Leftrightarrow}{} DFT(\tilde{s}_l) \cdot H + \tilde{W} \qquad (7)$$

Where vectors H and $\tilde{W}$ are the Fourier transforms of h and noise vector $\tilde{w}$, respectively, The tilde symbol indicates the signal after the CP removal. H is commonly referred to as a channel transfer function. Note that the size of DFT here is MN points. It follows from equation (7) that if the channel transfer function H is known from channel estimation, channel impairments can be compensated using a one-tap frequency domain equalizer. For the demodulation of each of M OFDM symbols from the frame, the equalized frequency domain signal has to be converted back into the time domain for the IDFT demodulation. The left hand side of equation (7) represents an unequalized received frame sequence, $\tilde{r}_l$. An equalization process producing an equalized guard-removed $$s_l = [\underbrace{x_{l,M-1}(N-p+1), \ldots, x_{l,M-1}(N-1)}_{\text{prefix}},$$

$$\underbrace{x_{l,0}(0), \ldots, x_{l,0}(N-1), x_{l,1}(0), \ldots, x_{l,1}(N-1), \ldots, x_{l,M-1}(0), \ldots, x_{l,M-1}(N-1)}_{M \text{ OFDM symbols}}]^T.$$

(5)

frame sequence $\tilde{r}_l^{FEQ}$ from the unequalized frame sequence, $\tilde{r}_l$ is therefore implemented in two steps on the basis of the following equation (8):

$$\tilde{r}_l^{FEQ} = IDFT\left\{\frac{DFT(\tilde{r}_l)}{\hat{H}}\right\} + \tilde{w}_l^{FEQ} \qquad (8)$$

where $\tilde{w}_l^{FEQ}$ is the AWGN noise after the equalization, and the division at the right-hand side of equation (8) is an element-by-element division.

The operations defined by the right-hand-side of equation (8) are performed by the first and second processing units 437 and 439. The first processing unit 437 receives the guard-removed frame sequence $\tilde{r}_l$, performs M×N point DFT to calculate an equalized frame spectrum in a frequency domain, and then, as shown in the argument of the IDFT function in the right hand side of equation (8), computes an equalized frame spectrum performing an element-by-element division of the equalized frame spectrum by the estimated channel transfer function $\hat{H}$ provided by the DSP unit 433. The M×N point equalized frame spectrum is then passed to the second processing unit 439 to perform the inverse DFT and produce the equalized time-domain frame $\tilde{r}_l^{FEQ}$.

The equalized frame $\tilde{r}_l^{FEQ}$, consisting of a sequence of M×N waveform samples, is then passed to third processing means 445 adapted to split the equalized frame into M OFDM symbols for demodulation with M demodulator units $445_1$-$445_M$ each adapted to perform an N point DFTs. The third processing means 445 outputs a set of M×N complex modulation coefficients corresponding to received m-ary symbols. This set of M×N received m-ary symbols produced from each equalized OFDM frame by the processing means 445 is passed to a parallel to serial converter 455 adapted to convert the set of M×N received m-ary symbols into a sequence of the received M×N m-ary data symbols. This sequence is then passed to an MQAM decoder 465 to produce a sequence of information bits reproducing the input binary sequence.

The processing means 437, 439 and 445 can be integrated or separate structures implemented in either software or hardware or a combination thereof commonly known to provide the aforedescribed functionalities, including DSPs, ASICs, and FPGAs. For example, they can be implemented using a single DSP programmed with corresponding sets of instructions. This DSP can also perform the aforedescribed functions of units 433, 435, 455 and 465 shown in FIG. 6.

A method of channel and frequency offset estimation in accordance with one embodiment of the instant invention will now be discussed.

We first note that accuracy of the channel estimation is crucial to the performance of the overall system in terms of bit or symbol error rate. The frequency offset Δf has also to be estimated and corrected to avoid inter-carrier interference (ICI) due to the loss of orthogonality among the subcarriers. A variety of approaches to the channel estimation and the frequency offset estimation is know in the art and can be used in the method and system of present invention, as will be understood by those skilled in the art. An embodiment of the method of this invention for channel estimation will be described herein that provides a joint maximum likelihood (ML) estimator of the frequency offset and the channel impulse response. The method is based on inserting an MSE-OFDM preamble sequence in the sequence of OFDM frames at the OFDM transmitter, and analyzing channel-induced changes in the received preamble sequence at the OFDM receiver using a prior knowledge of the preamble structure. The structure of the MSE-OFDM preamble is exploited to reduce the complexity of the estimators.

The MSE-OFDM preamble sequence a is generated at the OFDM transmitter by a preamble generator 360 and inserted in the MSE-OFDM frame sequence prior to information-carrying frames. If the transmission channel characteristics are expected to vary with time, the preamble sequence is inserted repeatedly in time to enable equalization adjustment at the receiver to changing channel. A resulting structure of the MSE-OFDM signal 500 according to present invention is shown in FIG. 5.

The MSE-OFDM preamble vector a has a length N. i.e., it has N elements and has therefore the duration of one OFDM symbol. The preamble sequence generated by the preamble generator 360 is also extended by a cyclic guard portion of length P, in this illustrative embodiment—by a CP with length P. The preamble generator 3360 can be embodied in different ways as known to those skilled in the art. For example, in one embodiment the preamble generator 360 can include a buffer wherein a pre-determined preamble sequence is stored. In other embodiments, it can be an FFT-based OFDM signal generator with a fixed input. Details of the preamble design will be discussed hereafter in this specification.

A mathematical foundation of the joint channel and frequency offset estimator of this embodiment of the method of present invention will now be described.

If the inter-symbol interference is completely mitigated by the CP, the received preamble vector y after CP removal can be expressed as $$y = \Gamma(\Delta k)Ah + w \qquad (9)$$

where Δk is the relative frequency offset: Δk=TΔf and Γ(Δk) is a diagonal matrix:

$$\Gamma(\Delta k) = \text{diag}\{1, e^{j2\pi\Delta k/N}, e^{j4\pi\Delta k/N}, \ldots, e^{j2\pi(N-1)\Delta k/N}\} \qquad (10)$$

A is N×P matrix with elements $$[A]_{i,j} = a_{i-j}, \; 0 \leq i \leq N-1, \; 0 \leq j \leq P-1. \qquad (11)$$

A cyclic notation is used in equation (11) for the preamble vector elements $a_k$, so that $a_{-k}=a_{N-k-1}$ and negative indexes correspond to a cyclic extension of the preamble. Noise vector $w=[w(0), w(1), \ldots, w(N-1)]^T$ is a zero-mean Gaussian vector with a covariance matrix $C_w = E\{ww^H\} = \sigma_n^2 I_N$, where $I_N$ is the N×N identity matrix. The vector of the received signal y has a Gaussian distribution with a mean Γ(Δk)Ah and a covariance matrix $\sigma_n^2 I_N$. Thus, a likelihood function for the parameters (h, Δk) can be written as $$\Lambda(y \mid h, \Delta k) = \frac{1}{(\pi\sigma_n^2)^N} \exp\left\{-\frac{1}{\sigma_n^2}\{[y - \Gamma(\Delta k)Ah]^H [y - \Gamma(\Delta k)Ah]\}\right\}. \qquad (12)$$

Maximum likelihood channel estimation can be achieved choosing h and Δk such that the maximum likelihood function given by equation (12) is maximized. This is equivalent to minimizing a function $\Lambda_L(y|h,\Delta k)$ given by an equation $$\Lambda_L(y|h, \Delta k) = Tr\{[y - \Gamma(\Delta k)Ah]^H [y - \Gamma(\Delta k)Ah]\}. \qquad (13)$$

Since $\Lambda_L(y|h, \Delta k)$ is a convex function over h and Δk, the estimation of h can be obtained by choosing h that satisfies the condition $$\frac{\partial \Lambda_L(y \mid h, \Delta k)}{\partial h} = 0. \qquad (14)$$

An estimate of the channel transfer function ĥ can be obtained from equation (13) and (14):

$$\hat{h} = (A^H A)^{-1} A^H \Gamma^H(\Delta k) y. \qquad (15)$$

If we substitute ĥ back into $\Lambda_L(y|h, \Delta k)$, it is found that maximizing the likelihood function, $\Lambda_L(y|h, \Delta k)$, is equivalent to maximizing a function $$\xi(\Delta k) = y^H \Gamma(\Delta k) B \Gamma^H(\Delta k) y \quad (16)$$

Where a matrix $B = A(A^H A)^{-1} A^H$.

A frequency offset estimator can be formulated as $$\Delta \hat{k} = \arg\max_{\Delta k} \{\xi(\Delta k)\}. \quad (17)$$

Equation (16) indicates that estimations of $\Delta k$ and h can be separated, i.e., the frequency offset $\Delta k$ can be estimated in a step prior to estimation of the channel CIR vector h. This observation coincides with the results published in an article of P. Stoica et al., "Training sequence design for frequency offset and frequency-selective channel estimation," *IEEE Trans. Commun*, vol. 51, no. 11, pp. 1910-1917, November 2003.

Once the estimated frequency offset $\Delta \hat{k}$ is obtained, channel estimation can be performed using the following formula $$\hat{h} = (A^H A)^{-1} A^H \Gamma^H(\Delta \hat{k}) y \quad (18)$$

The maximization of the $\xi(\Delta k)$ in (16) can be realized with a two-step procedure. First, a coarse search procedure computes $\xi(\Delta k)$ over a grid of discrete $\Delta \hat{k}$ values and determines the location of its maximum. The $\xi(\Delta \hat{k})$ values near the maximum are interpolated in a next step for a fine search of $\Delta \hat{k}$. However, these search steps require a large number of complex operations due to the matrix manipulations when calculating $\xi(\Delta k)$, as the term $y^H \Gamma(\Delta k) B \Gamma^H(\Delta k) y$ has to be calculated multiple times.

A simplified embodiment of the joint frequency estimator will now be described. The estimator is programmed into the synchronization and channel estimation unit 433 as an embedded set of processor instructions implementing processing steps described hereinafter, and the unit 433 is embodied as a DSP adopted to perform the instruction set.

This embodiment of the joint estimator uses a specific preamble structure realized at the transmitter, which is exploited to reduce the complexity of the frequency offset estimator and described by H. Song, Y. You, J. Paik and Y. Cho, in an article "Frequency-offset synchronization and channel estimation for OFDM-based transmission," *IEEE Commun. Letters*, vol. 4, no. 3, pp. 95-97, March 2000, which is included herein by reference.

Figure 7:
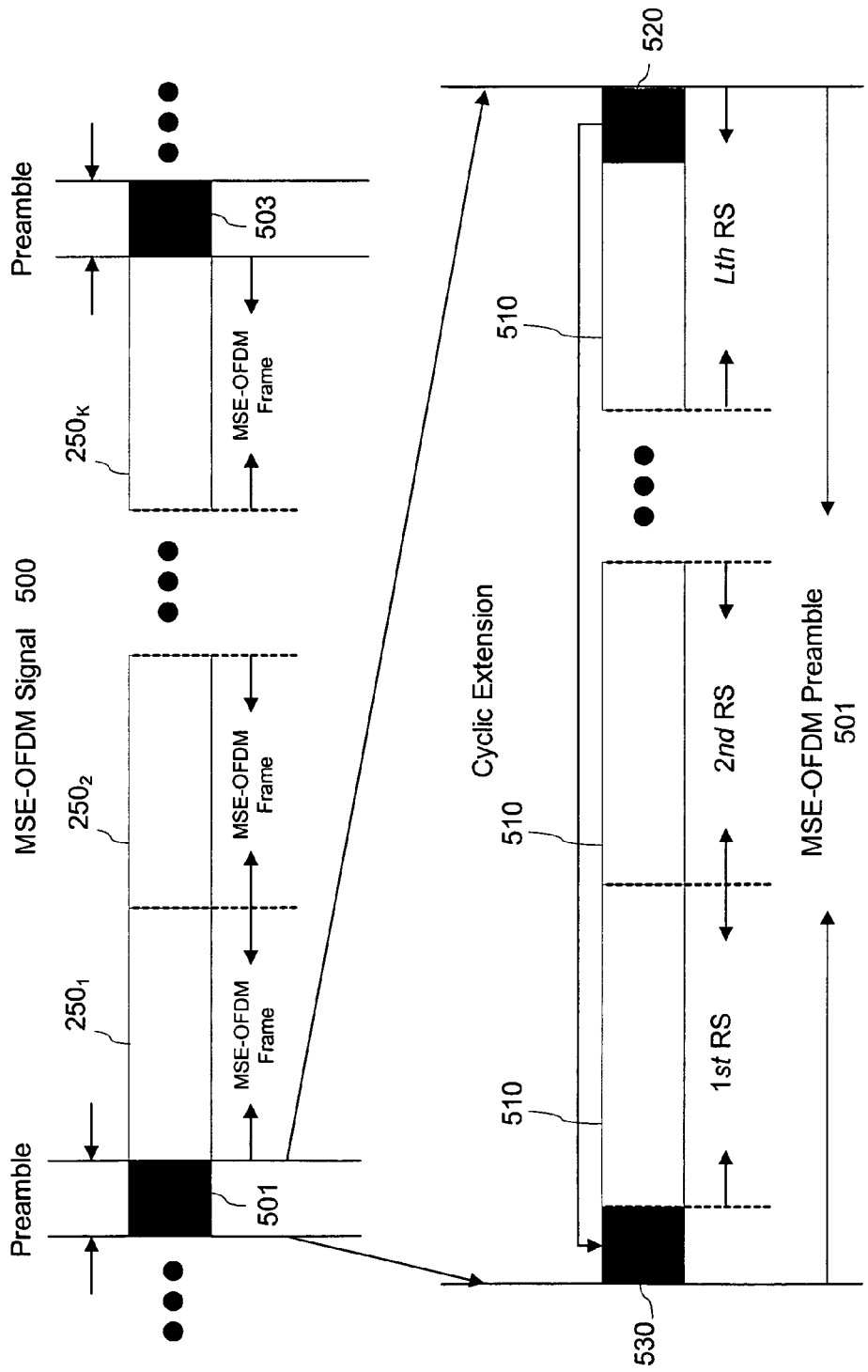
FIG. 7 is diagram of an MSE-OFDM signal including a preamble.

With reference to FIG. 7, the preamble sequence 501 has an even number, L, of repetitive slots (RS) 510 within each preamble. A particular selection of the number of identical slots is a tradeoff between the frequency offset estimation accuracy, frequency offset estimation range, and channel estimation accuracy. Advantageously, this preamble structure allows bundling groups of RS together in L' sub-blocks, where L' can be between 2 and L, to obtain a new RS of different size, as explained by H. Song et al. in further detail; selection of a particular sub-block granularity L' allows to adjust the frequency offset estimation range and the estimation accuracy to a particular application.

By averaging over consecutive sub-block pairs L'-1 times, the carrier frequency offset can be estimated using the equation (19)

$$\Delta \hat{k} = \frac{L'}{2\pi} \arg\left\{\sum_{p=0}^{L'-2} \sum_{n=0}^{N/L'-1} y^*_{pN/L'+n} y_{(p+1)N/L'+n}\right\}. \quad (19)$$

The variance of the estimation error can be evaluated using equation (20):

$$\text{var}[\Delta \hat{k}] = \left(\frac{L'}{2\pi}\right)^2 \frac{L'}{(L'-1)N}(SNR)^{-1}. \quad (20)$$

where a signal to noise ratio $SNR = E_s^2/\sigma_n^2$.

Accordingly, the joint frequency offset and channel estimator uses computation steps given in equation (19) to compute the frequency offset estimate in a first step of the joint estimation process. The estimated frequency offset is then sent to the channel equalizer 436 which performs frequency correction of the guard-removed OFDM frames prior to performing the aforedescribed equalization steps. In some embodiments, this signal is used to adjust the frequency of a local oscillator used for the frequency down-conversion of the received OFDM signal in the RF receiver.

Having obtained the estimated frequency offset $\Delta \hat{k}$, the frequency offset in the received signal can be at least partly compensated prior to the channel impulse response estimation. By doing so, the impact of the frequency offset on the channel estimation reduces to an impact due to a residual frequency offset $\Delta k - \Delta \hat{k}$.

A compensation of the frequency offset is performed in a second step of the joint estimation process as a shift of the received preamble sequence y by $-\Delta \hat{k}$ in the frequency domain. This step, also performed by the DSP unit 433, produces a frequency-corrected received preamble sequence y' by multiplying the received preamble sequence by a diagonal matrix $$\Gamma(-\Delta \hat{k}) = \text{diag}\{1 e^{-j2\pi\Delta \hat{k}/N}, e^{-j4\pi\Delta \hat{k}/N}, \ldots, e^{-j2\pi(N-1)\Delta \hat{k}/N}\} \quad (22)$$

as described by the following equation (21):

$$y' = \Gamma(-\Delta \hat{k}) y \quad (21)$$

The channel impulse response is then estimated in a next step using a simplified estimator defined by equation (24):

$$\hat{h} \approx (A^H A)^{-1} A^H y'. \quad (24)$$

To reduce the estimation complexity, the matrix $(A^H A)^{-1} A^H$ is pre-calculated and stored in the synchronization and channel estimation unit 433.

In this embodiment of the joint estimator, only N×P complex multiplications are needed.

Once an estimate of the channel CIR ĥ is obtained, an estimated channel transfer function Ĥ is determined in a next step using a pruning FFT to reduce the computation complexity, as known to those skilled in the art. This operation needs $$N_{mp} = 2MN \lfloor \log_2 P \rfloor - 2MN - 4P + 4 + \frac{2MNP}{2^{\lfloor \log_2 P \rfloor}} \quad (25\text{-a})$$

real multiplications and $$N_{add} = 3MN \lfloor \log_2 P \rfloor - 2P - 3MN + 2 + \frac{3MNP}{2^{\lfloor \log_2 P \rfloor}} \quad (25\text{-b})$$

real additions. In equations (25-a) and (25-b), the function $\lfloor \ \rfloor$ returns an integer part of its argument.

To further reduce the computation complexity, the length of ĥ can be truncated in some embodiments of the estimator using a threshold approach, exploiting that P represents a maximum expected CIR length, and a true CIR is often much smaller than P. Note here if Δk−Δk̂=0, the above estimator is identical to a conventional ML channel estimator. A mean square error of the channel estimation can be evaluated using the following formula (26)

$$MSE = E\left[Tr\left\{[\hat{h} - h]^H [\hat{h} - h]\right\}\right] \quad (26)$$
$$= E[Tr\{(A^H A)^{-1} A^H ww^H A(A^H A)^{-1}\}]$$
$$= \sigma_n^2 Tr\{(A^H A)^{-1}\}.$$

In a final step of the channel estimation process, the estimated channel transfer vector H is passed to the processing means 437 for channel equalization, as described hereinbefore.

The aforedescribed MSE OFDM frame structure of the present invention provides additional degree of freedom thereby enabling optimization of various system parameters.

In one embodiment that can be used for static or slowly-varying channels, the bandwidth efficiency of the OFDM signaling is improved through reducing the number of CP insertions, as shown in FIG. 2; this system is referred to herein as a CP-reduced system. In a conventional OFDM system, the length of each OFDM symbol is chosen to be typically between 4 and 16 times the CIR length as a trade-off between the bandwidth efficiency of the system and the system sensitivity to sampling frequency synchronization, with the later increasing as the sub-carrier frequency spacing decreases for longer symbols. In the CP-reduced MSE-OFDM system, the length of each OFDM symbol remains the same as for the conventional OFDM system. The bandwidth efficiency is improved as a redundancy introduced by the CP insertion, which is the ratio between the CP duration and the MSE-OFDM frame duration, decreases with a longer frame size.

Figure 8:
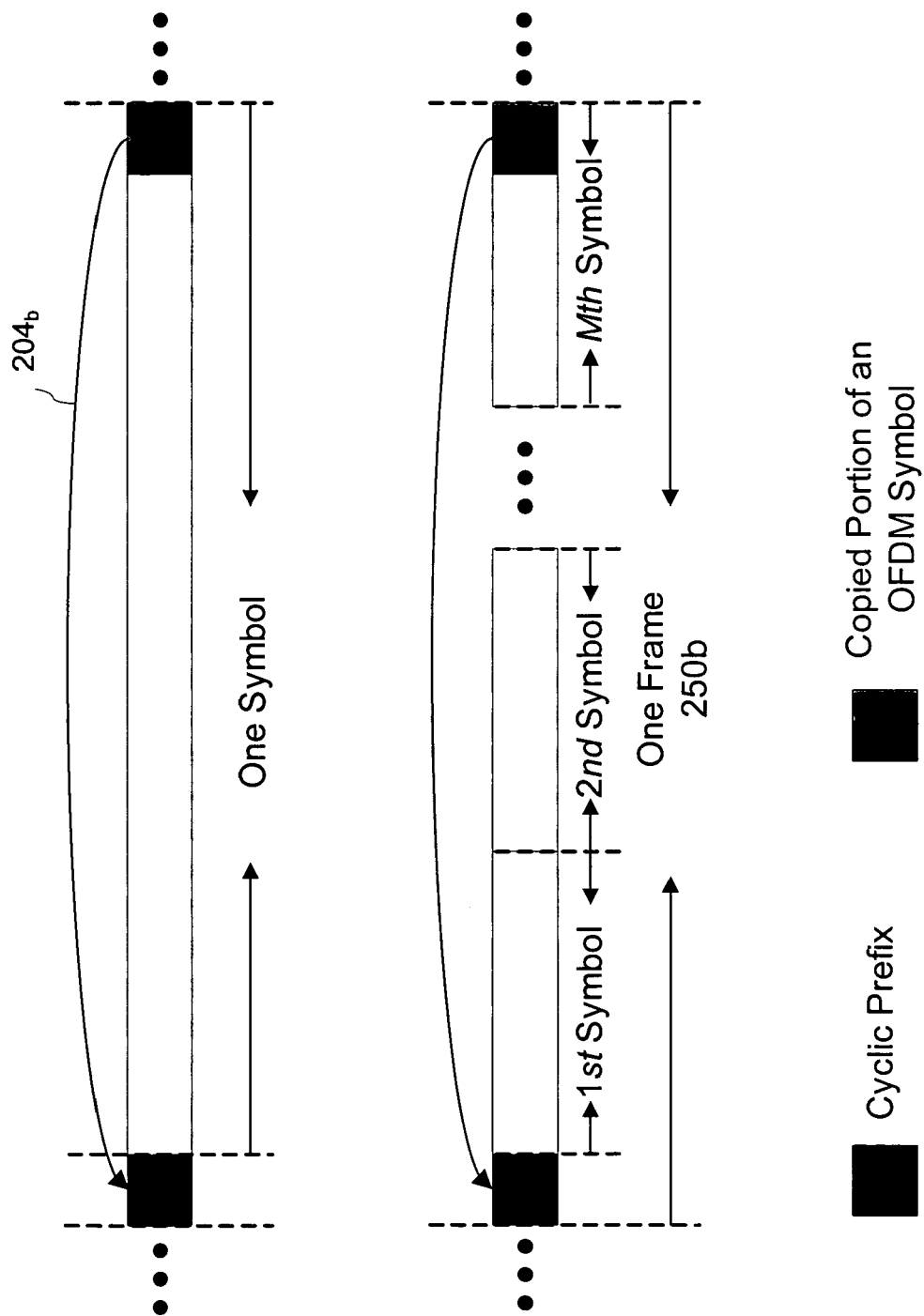
FIG. 8 is a diagram of an MSE-OFDM frame for an FFT-size reduced transmission system in comparison with a conventional OFDM signal structure.

With reference to FIG. 8, another embodiment, termed hereinafter as an FFT size reduced system, is designed to keep the MSE-OFDM frame duration the same as for a conventional OFDM symbol 201b, i.e., to reduce the symbol duration T for MSE-OFDM system while keeping its bandwidth unchanged and thereby preserving the bandwidth efficiency. However, reducing the OFDM symbol duration T while keeping the OFDM bandwidth is equivalent to reducing the number of subcarriers N and the DFT size of the MSE-OFDM system. By doing so, the PAPR and robustness to frequency offset of the MSE-OFDM system can be substantially improved.

Improvements to the bandwidth efficiency, the PAPR and robustness to frequency offset for different implementations of the MSE-OFDM system of present invention will now be described.

Bandwidth Efficiency: Each OFDM subcarrier conveys a symbol taken from a two-dimensional (2-D) signal constellation with $2^v$ points and is modulated during T seconds. Taking the CP duration into consideration, the bandwidth efficiency, $\eta_1$, is given by:

$$\eta_1 = v \frac{N}{(N+P)} \text{ bits/s/Hz}, \quad (27)$$

For the CP reduced MSE-OFDM system, the bandwidth efficiency, $\eta_2$, becomes $$\eta_2 = v \frac{MN}{(MN+P)} \text{ bits/s/Hz}, . \quad (28)$$

The improvement in bandwidth efficiency of the MSE-OFDM system from conventional OFDM systems can be expressed as:

$$\Delta \eta = \eta_2 - \eta_1 = v \frac{PN(M-1)}{(N+P)(MN+P)} \text{ bits/s/Hz}, . \quad (29)$$

TABLE 1

Bandwidth efficiency improvement of CP reduced MSE-OFDM system.

| M | 1 | 4 | 8 | 16 |
|---|---|---|---|---|
| $\eta_2$ | 3.5556 | 3.8788 | 3.9385 | 3.9690 |
| $\Delta\eta$ | 0 | 0.3232 | 0.3829 | 0.4134 |

Table 1 shows improvement of the bandwidth efficiency for a CP reduced system depending on the number of OFDM symbols M in a frame, as compared to the prior art system having 64 subcarriers with CP length of 8 and 16 QAM modulation. The bandwidth efficiency of the CP reduced MSE-OFDM system is improved. As M increases, the bandwidth efficient improvement, Δη, tends to completely compensate the CP-related redundancy of the prior art system vP/(N+P)=0.4444 bits/s/Hz. Infinitely large number of the OFDM symbols have to be encapsulated together to fully remove the redundancy caused by the cyclic prefix. However, even having M=4, corresponding to a frame length exceeding the CP length by a factor of 32, removes 75% of the redundancy.

Impact of Synchronization Errors: denoting as hereinbefore the relative frequency offset, i.e. the ratio of the actual carrier frequency offset to the subcarrier spacing, as Δk, the DFT demodulation performed by the processing unit 445 produces a set of complex modulation samples, with a k-th modulation sample obtained by demodulating kth sub-carrier defined by $$R_k = AX_k + I_k + W_k, \quad (30)$$

where $$A = \frac{\sin(\pi \Delta k)}{N \sin(\pi \Delta k / N)} e^{j\pi \Delta k (N-1)/N}, \quad (31)$$

$$I_k = \sum_{\substack{l=-K \\ l \neq k}}^{K} X_l \cdot \frac{\sin(\pi \Delta k)}{\sin(\pi (l-k+\Delta k)/N)} \cdot e^{-j\pi(l-k+\Delta k)/N} \cdot e^{j\pi \Delta k (N-1)/N}, \quad (32)$$

And $$W_k = \frac{1}{\sqrt{N}} \sum_{n=0}^{N-1} \omega'(n) \cdot e^{\frac{j2\pi kn}{N}}. \quad (33)$$

A, $I_k$ and $W_k$ represent the complex gain, the inter-carrier interference (ICI) due to the frequency offset and the AWGN noise after DFT, respectively. Equation (30) indicates that each subcarrier has a common error including attenuation and phase rotation described by a complex constant A in (31). A symbol error rate (SER) of the MSE-OFDM systems with synchronization errors can be evaluated using know in the art approaches. It is also know in the art that the SER performance of an OFDM system with frequency offset is dominated by ICI.

Therefore, the FFT size reduced MSE-OFDM system can be more robust to frequency offset, as a direct result of reducing the number of subcarriers. Indeed, the relative frequency offset is inversely proportional to the number of the subcarriers in the MSE-OFDM system when the bandwidth of the MSE-OFDM signal remains unchanged. Conventional OFDM systems have a symbol duration of 4~16 times of the channel impulse response time. This symbol duration is limited by the channel coherence time. In an MSE-OFDM system having $M \geq 4$ and a similar frame duration as the conventional systems, i.e. 4~16 times greater than the channel impulse response time, the symbol duration of this MSE-OFDM system is much smaller than the symbol duration of the conventional OFDM system, which implies the carrier spacing is much larger than in the conventional OFDM system, yielding reduced sensitivity to the carrier frequency offset.

Reducing the number of subcarriers within the same OFDM bandwidth, however, results in subcarriers' bandwidth to expand. If the subcarrier bandwidth is larger than the coherence bandwidth of the channel then it is not possible to use a single tap frequency domain equalization technique. Even static and slowly varying channels can have small coherence bandwidths, because of long multipath delays. However, this can be avoided using known in the art time domain processing techniques similar to impulse response shortening for DSL systems to reduce the effective length of the impulse response.

Reduction of Peak-to-average Power Ratio: The peak-to-average power ratio for baseband MSE-OFDM signal s(t) can be defined as $$PAPR = \frac{\max[|s(t)|^2]}{P_s} \quad (34)$$

where $P_s$ corresponds to the average power of the desired baseband MSE-OFDM signal. For mathematical convenience, we alternatively consider the crest factor (C), which is defined as the square-root of the PAPR, i.e., $$C = \sqrt{PAPR} = \frac{\max|s(t)|}{\sqrt{P_s}} = \max|\gamma(t)| \quad (35)$$

Where $$\gamma(t) = \frac{|s(t)|}{\sqrt{P_s}} = \sqrt{\frac{s_I^2(t) + s_Q^2(t)}{P_s}} \quad (36)$$

is the envelope of the complex baseband MSE-OFDM signal normalized by the average power. By assumption, the in-phase and quadrature components of s(t), i.e., $s_I(t)$ and $s_Q(t)$ are asymptotically Gaussian for large N, and the uncorrelated samples of $s_I(t)$ and $s_Q(t)$ become independent Gaussian random variables, due to the fact that uncorrelated Gaussian random variables are statistically independent. Thus $\gamma(t)$ is a Raleigh random variable of which the cumulative distribution function is given by:

$$F_c(\gamma) = \Pr(|s(t)| < \gamma) = \exp\left[-\sqrt{\frac{\pi}{3}} N\gamma e^{-\gamma^2}\right]. \quad (37)$$

In practice, the complementary cumulative distribution function $\Pr(C > \gamma) = 1 - F_c(\gamma)$ is of particular interest, as it is directly related to the PAPR. It is clear from (16) that the approximated complementary cumulative distribution of PAPR only depends on the number of the subcarriers N for an OFDM system.

If the symbol duration and bandwidth of the MSE-OFDM system are kept the same as for the conventional OFDM system, the peak-to-average power ratio will be the same for the two systems, since the number of the subcarriers are the same for both systems. However, the symbol duration of the FFT size reduced MSE-OFDM system becomes 1/M of a conventional OFDM symbol. This indicates that the number of subcarriers becomes 1/M of the number of subcarriers in the original OFDM system when the total bandwidth remains the same. Therefore, the PAPR of FFT-size reduced MSE-OFDM system is reduced because of the smaller number of subcarriers.

Quantization Noise Suppression: Another disadvantage caused by the high PAPR is the quantization noise. OFDM signals have to be normalized to the conversion range of the D/A and A/D converters for transmission and reception purpose. Higher PAPRs imply a higher resolution requirement for D/A and A/D converters. Let $\sigma_q^2$ be the variance of the quantization error which can be determined as $$\sigma_q^2 = \frac{Q^2}{12} = \frac{\left(\frac{A}{2^{L-1}}\right)^2}{12}, \quad (38)$$

where A, Q, and L are the maximum of the OFDM signal, quantization interval and word length of A/D converter, respectively. With the above notation, the signal-to-quantization noise ratio (SQNR) can be determined as:

$$SQNR = \frac{E_s}{\sigma_q^2} = \frac{12 \cdot 2^{2L-2}}{PAPR} \quad (39)$$

where $E_s$ is the average power. It is obvious that as the PAPR increases, the SQNR decreases. With the proposed MSE-OFDM system, the SQNR can be improved by $10 \log_{10} \Delta PAPR$ dB. Or if it is desired that the signal to quantization noise level be unchanged, an ADC or DAC with a short word length is sufficient. The reduction of the word length can be calculated from (39) as:

$$\Delta L = \frac{\log_2 PAPR - \log_2 PAPR'}{2} \quad (40)$$

where PAPR' is the peak-to-average power ratio for the MSE-OFDM system. System implementation cost can therefore be reduced by using a less expensive ADC or DAC in the FFT-size reduced embodiment.

Of course numerous other embodiments may be envisioned without departing from the spirit and scope of the invention.

What is claimed is:

1. An OFDM receiver for receiving a multi-symbol encapsulated (MSE) OFDM signal transmitted along a transmission channel, said MSE OFDM signal comprising a preamble sequence having a pre-determined structure, the OFDM receiver comprising:

an A/D converter for sampling the received OFDM signal at a sampling frequency and for producing a sequence of received waveform samples;

a synchronization and channel estimation unit adapted to identify the preamble sequence in the sequence of received waveform samples and to perform channel and frequency offset estimation from the received preamble sequence and the pre-determined structure of the preamble sequence;

a cyclic guard removing unit adapted to identify information-bearing OFDM frames in the sequence of received waveform samples, to remove the cyclic guard portions from each identified OFDM frame and to produce a sequence of guard-removed OFDM frames;

a channel equalizer, comprising:

first processing means adapted to perform at least an M×N points DFT and M×N complex multiplications for converting the guard-removed OFDM frames to frequency domain, and for frequency-domain equalization to produce a sequence of equalized frame spectra; and, second processing means adapted to perform at least an M×N point inverse DFT on each equalized frame spectrum to produce a sequence of equalized guard-less OFDM frames, each comprising M OFDM symbols;

third processing means adapted for splitting the equalized frame into M OFDM symbols, performing M N-point inverse DFTs for demodulating the equalized guard-less OFDM frames and for producing a set of M×N received m-ary symbols from each equalized OFDM frame; and, a parallel-to-serial converter adapted to convert the set of M×N received m-ary symbols into a received sequence of m-ary data symbols.

2. A method for an orthogonal frequency division multiplexing (OFDM) transmission comprising:

converting an input sequence of data symbols into a sequence of OFDM frames, wherein each said OFDM frame comprises a sequence of M>1 OFDM symbols and only one cyclic guard portion, using the steps of:

sequentially performing frequency domain multiplexing of M subsets of N>1 data symbols using an N-point inverse DFT for producing a sequence of M N-point OFDM symbols, and forming an OFDM frame from the sequence of M N-point OFDM symbols by appending a cyclic guard portion at an end thereof; and, performing digital-to-analog (D/A) conversion of the sequence of OFDM frames for producing an OFDM signal;

transmitting the OFDM signal along a transmission channel;

receiving the OFDM signal with an OFDM receiver; and, equalizing and demodulating the OFDM signal;

wherein the step of equalizing and demodulating the OFDM signal includes the steps of:

sampling the received OFDM signal at a sampling frequency $f_s$ to produce a sequence of waveform samples;

identifying OFDM frames in the sequence of waveform samples; and, for each identified OFDM frame, removing P waveform samples from the OFDM frame to produce a sequence of M×N waveform samples, performing frequency-domain equalization of the sequence of M×N waveform samples, and demodulating the sequence of M×N waveform samples using M N-point DFTs for producing an output sequence of M×N m-ary data symbols;

wherein the step of performing frequency-domain equalization comprises the steps of:

computing a multi-symbol frequency spectrum of the sequence of M×N waveform samples using an M×N points DFT;

performing element-by-element division of the multi-symbol frequency spectrum by a channel transfer function;

computing an equalized multi-symbol sequence of M×N waveform samples using an inverse DFT.

3. A method according to claim 2, wherein the cyclic guard portion of each frame is a cyclic suffix following the data section of said frame.

4. A method according to claim 2, wherein the transmission channel has an impulse response length, and wherein each cyclic guard portion has a length at least equal to the impulse response length of the communication channel.

5. A method according to claim 2, wherein the input sequence of m-ary data symbols is a sequence of MQAM symbols.

6. A method according to claim 2, wherein the cyclic guard portion of each frame is a cyclic prefix preceding the data section of said frame.

7. A method according to claim 2, further comprising the steps of:

inserting a preamble sequence in the OFDM signal prior to the transmitting, the preamble sequence having a pre-determined structure and comprising a cyclic guard portion of length P; and, extracting a received preamble sequence from the sequence of received waveform samples at the OFDM receiver;

processing the received preamble sequence for joint estimation of a channel transfer function and a frequency offset from the pre-determined structure of the preamble.

8. A method according to claim 7, wherein the preamble sequence is comprised of an even number of repetitive slots, and wherein the step of processing the received preamble sequence comprises the steps of:

estimating the frequency offset from correlations between the repetitive slots received by the receiver;

removing the estimated frequency offset from the received preamble sequence to produce a frequency-corrected received preamble sequence;

estimating the channel transfer function from the pre-determined structure of the preamble and the frequency-corrected received preamble sequence.

9. A method according to claim 2, wherein the step of providing an input sequence of m-ary data symbols comprises the step of forming the input sequence of m-ary data symbols from an input binary sequence; and the step of equalizing and demodulating the OFDM signal further comprises the step of decoding the output sequence of m-ary samples for producing an output binary sequence.

10. A method of claim 2, wherein at least some of the OFDM frames have a length exceeding the length of the cyclic guard portion by at least a factor of 30 for providing a high bandwidth efficiency.

11. A method of claim 2, wherein at least some of the OFDM frames have a length exceeding the length of the cyclic guard portion by at most a factor of 16, and comprising each at least 4 OFDM symbols for providing reduced carrier frequency offset sensitivity of the method.

12. A method of claim 2, wherein the OFDM signal has a peak-to-average-power-ratio, and wherein integer numbers N and M are selected for reducing a number of sub-carriers of the OFDM signal to obtain a pre-determined low value of the peak-to-average-power-ratio and a pre-determined bandwidth efficiency.

13. The OFDM receiver of claim 1, wherein the synchronization and channel estimation unit comprises a pre-calculated matrix definable by a mathematical expression $[(A^H \cdot A)^{-1} \cdot A^H]$ stored therein, wherein matrix A is composed of elements $a_k$ of the preamble sequence, $k=0, \ldots, N-1$, wherein N is a length of the preamble sequence, for use in determining a channel impulse response from the sequence of received waveform samples.

14. The OFDM receiver of claim 13, wherein the synchronization and channel estimation unit utilizes a pruning fast Fourier transform (FFT) to determine an estimated channel transfer function from the channel impulse response.

15. The OFDM receiver of claim 14, wherein the synchronization and channel estimation unit is configured to truncate the channel impulse response based on a maximum expected channel duration prior to performing the pruning FFT.

16. The method of claim 8, wherein the step of removing the estimated frequency offset from the received preamble sequence comprises computing a frequency offset compensation matrix $\Gamma(-\Delta\hat{k}) = \mathrm{diag}\{1, e^{-j2\pi\Delta\hat{k}/N}, e^{-j4\pi\Delta\hat{k}/N}, \ldots, e^{-j2\pi(N-1)\Delta\hat{k}/N}\}$, wherein $\Delta\hat{k}$ is the estimated frequency offset and wherein N is a length of the preamble sequence.

17. The method of claim 16 comprising multiplying the sequence of M×N waveform samples by the frequency offset compensation matrix.

18. The method of claim 8, comprising using a pre-calculated matrix defined by a mathematical expression $[(A^H \cdot A)^{-1} \cdot A^H]$, wherein A is a matrix composed of elements $a_k$ of the preamble sequence, $k=0, \ldots, N-1$, wherein N is a length of the preamble sequence, for estimating a channel impulse response from the sequence of received waveform samples.

19. The method of claim 18, comprising using a pruning fast Fourier transform (FFT) for estimating the channel transfer function from the channel impulse response.

20. The method of claim 19, comprising truncating the channel impulse response based on a maximum expected channel duration prior to performing the pruning FFT.

* * * * *